US012695791B2

(12) United States Patent
Ranade et al.

(10) Patent No.: US 12,695,791 B2
(45) Date of Patent: **\*Jul. 28, 2026**

(54) SECURE ACCESS SERVICE EDGE FOR MOBILE NETWORKS

(71) Applicant: Palo Alto Networks, Inc., Santa Clara, CA (US)

(72) Inventors: Yogesh Vijay Ranade, San Jose, CA (US); Madhusudan Nanjanagud, San Jose, CA (US); Swaminathan Anantha, Mountain View, CA (US)

(73) Assignee: Palo Alto Networks, Inc., Santa Clara, CA (US)

( \* ) Notice: Subject to any disclaimer, the term of this patent is extended or adjusted under 35 U.S.C. 154(b) by 14 days.

This patent is subject to a terminal disclaimer.

(21) Appl. No.: 18/756,621

(22) Filed: Jun. 27, 2024

(65) Prior Publication Data

US 2025/0323948 A1 Oct. 16, 2025

Related U.S. Application Data

(60) Provisional application No. 63/661,476, filed on Jun. 18, 2024, provisional application No. 63/634,210,
(Continued)

(51) Int. Cl.
*H04L 9/40* (2022.01)
*H04L 67/10* (2022.01)
(Continued)

(52) U.S. Cl.
CPC .......... *H04L 63/20* (2013.01); *H04L 63/0227* (2013.01); *H04L 63/0263* (2013.01);
(Continued)

(58) Field of Classification Search
CPC . H04L 63/20; H04L 63/0227; H04L 63/0263; H04L 63/10; H04L 63/145;
(Continued)

(56) References Cited

U.S. PATENT DOCUMENTS 10,432,673 B2 \* 10/2019 Bansal .................. H04L 69/162
10,574,670 B1 2/2020 Verma
(Continued)

FOREIGN PATENT DOCUMENTS

| AU | 2020204346 | 9/2021 |
| EP | 3902226 | 12/2022 |
| WO | 2023220304 | 11/2023 |

OTHER PUBLICATIONS

ETSI, ETSI TS 129 244 V17.9.0 (Jul. 2023), LTE; 5G; Interface between the Control Plane and the User Plane nodes, (3GPP TS 29.244 version 17.9.0 Release 17), pp. 1-392.
(Continued)

*Primary Examiner* — El Hadji M Sall
(74) *Attorney, Agent, or Firm* — Van Pelt, Yi & James LLP

(57) ABSTRACT

Techniques for providing security for providing Secure Access Service Edge (SASE) for mobile networks (e.g., service provider networks for mobile subscribers) are disclosed. In some embodiments, a system/process/computer program product for providing SASE for mobile networks in accordance with some embodiments includes receiving traffic associated with a User Equipment (UE) from a mobile core network at a SASE cloud network; enforcing a security policy on data plane traffic associated with the UE based on contextual information associated with the UE to provide secured data plane traffic; and forwarding the secured data plane traffic from the SASE cloud network to its original destination.

20 Claims, 12 Drawing Sheets

Related U.S. Application Data filed on Apr. 15, 2024, provisional application No. 63/634,219, filed on Apr. 15, 2024.

(51) Int. Cl.

| | |
|---|---|
| *H04W 12/069* | (2021.01) |
| *H04W 12/088* | (2021.01) |
| *H04W 12/102* | (2021.01) |
| *H04W 12/122* | (2021.01) |
| *H04W 12/37* | (2021.01) |

(52) U.S. Cl.
CPC ............ *H04L 63/10* (2013.01); *H04L 63/145* (2013.01); *H04L 67/10* (2013.01); *H04W 12/069* (2021.01); *H04W 12/088* (2021.01); *H04W 12/102* (2021.01); *H04W 12/122* (2021.01); *H04W 12/37* (2021.01)

(58) Field of Classification Search
CPC .. H04L 67/10; H04L 63/0236; H04W 12/069; H04W 12/088; H04W 12/102; H04W 12/122; H04W 12/37; H04W 12/72
See application file for complete search history.

(56) References Cited

U.S. PATENT DOCUMENTS

| | | | | |
|---|---|---|---|---|
| 10,659,335 | B1 | 5/2020 | Morris | |
| 10,681,072 | B2 | 6/2020 | Alfano | |
| 10,693,918 | B2 | 6/2020 | Verma | |
| 10,715,491 | B2 | 7/2020 | Verma | |
| 11,606,691 | B1 | 3/2023 | Verma | |
| 11,622,313 | B1 | 4/2023 | Yadav | |
| 11,950,114 | B2 | 4/2024 | Peitzer | |
| 12,219,360 | B1 | 2/2025 | Gunjan | |
| 12,301,569 | B2 | 5/2025 | Jeuk | |
| 12,328,625 | B2 | 6/2025 | Verma | |
| 2010/0103837 | A1 | 4/2010 | Jungck | |
| 2014/0141743 | A1 | 5/2014 | Shaw | |
| 2017/0078922 | A1* | 3/2017 | Raleigh | ................... H04L 69/18 |
| 2018/0367574 | A1 | 12/2018 | Verma | |
| 2020/0128399 | A1 | 4/2020 | Verma | |

| | | | | |
|---|---|---|---|---|
| 2020/0213187 | A1 | 7/2020 | Padmanabhan | |
| 2020/0242251 | A1 | 7/2020 | Wisgo | |
| 2020/0412824 | A1 | 12/2020 | Liguori | |
| 2021/0234901 | A1 | 7/2021 | Thomas | |
| 2021/0258248 | A1 | 8/2021 | Josef | |
| 2021/0266262 | A1 | 8/2021 | Subramanian | |
| 2021/0336934 | A1 | 10/2021 | Deshmukh | |
| 2022/0103594 | A1 | 3/2022 | Galloway | |
| 2022/0103597 | A1 | 3/2022 | Gobena | |
| 2022/0247788 | A1 | 8/2022 | Subbanna | |
| 2022/0261276 | A1 | 8/2022 | Starr | |
| 2022/0329573 | A1 | 10/2022 | Sood | |
| 2022/0385579 | A1 | 12/2022 | Rangel Augusto | |
| 2023/0100395 | A1* | 3/2023 | Yadav | ................... H04W 12/72 |
| | | | | 370/392 |
| 2023/0269228 | A1 | 8/2023 | Donald | |
| 2024/0073698 | A1 | 2/2024 | Verma | |
| 2024/0107294 | A1 | 3/2024 | Silverlock | |
| 2024/0146727 | A1* | 5/2024 | Jeuk | ................... H04L 63/0876 |
| 2024/0388914 | A1* | 11/2024 | Barton | ............. H04W 28/0215 |
| 2025/0039138 | A1 | 1/2025 | Jain | |
| 2025/0071552 | A1 | 2/2025 | Xie | |
| 2025/0203367 | A1* | 6/2025 | Haddad | ............... H04W 12/043 |
| 2025/0220049 | A1 | 7/2025 | Israel | |
| 2025/0267460 | A1 | 8/2025 | Burgarella | |
| 2025/0279980 | A1 | 9/2025 | Yadav | |
| 2025/0310864 | A1 | 10/2025 | Chitresh | |

OTHER PUBLICATIONS

ETSI, ETSI TS 129 561 V17.9.0 (Jul. 2023), 5G; 5G System; Interworking between 5G Network and external Data Networks; Stage 3, (3GPP TS 29.561 version 17.9.0 Release 17), pp. 1-92.
Google Cloud, Partner Interconnect overview, downloaded on Apr. 4, 2024, pp. 1-12.
Arin, Route Origin Authorizations (ROAs), Overview, Feb. 24, 2025, 4 pages.
Author Unknown, Cluster configuration (proto), config.cluster.v3. Cluster, 37 pages, downloaded Oct. 16, 2024.
Google Cloud, Cloud Router Overview, Feb. 24, 2025, 4 pages.
Ahmad et al., Security in Software Defined Networks: A Survey, IEEE Communications Surveys & Tutorials, vol. 17 No. 4, 2015, pp. 2317-2346.

* cited by examiner

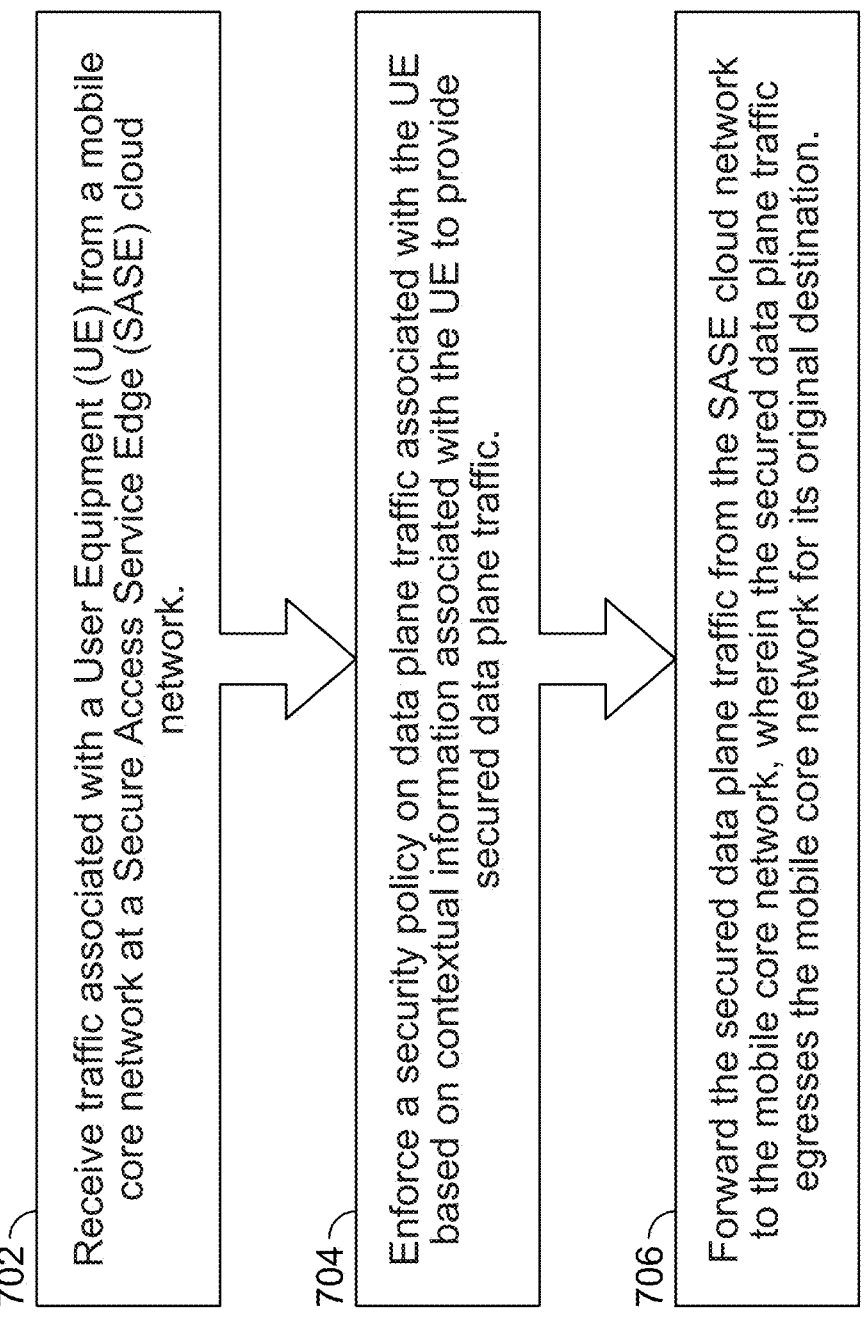

702 — Receive traffic associated with a User Equipment (UE) from a mobile core network at a Secure Access Service Edge (SASE) cloud network.

704 — Enforce a security policy on data plane traffic associated with the UE based on contextual information associated with the UE to provide secured data plane traffic.

706 — Forward the secured data plane traffic from the SASE cloud network to the mobile core network, wherein the secured data plane traffic egresses the mobile core network for its original destination.

FIG. 7

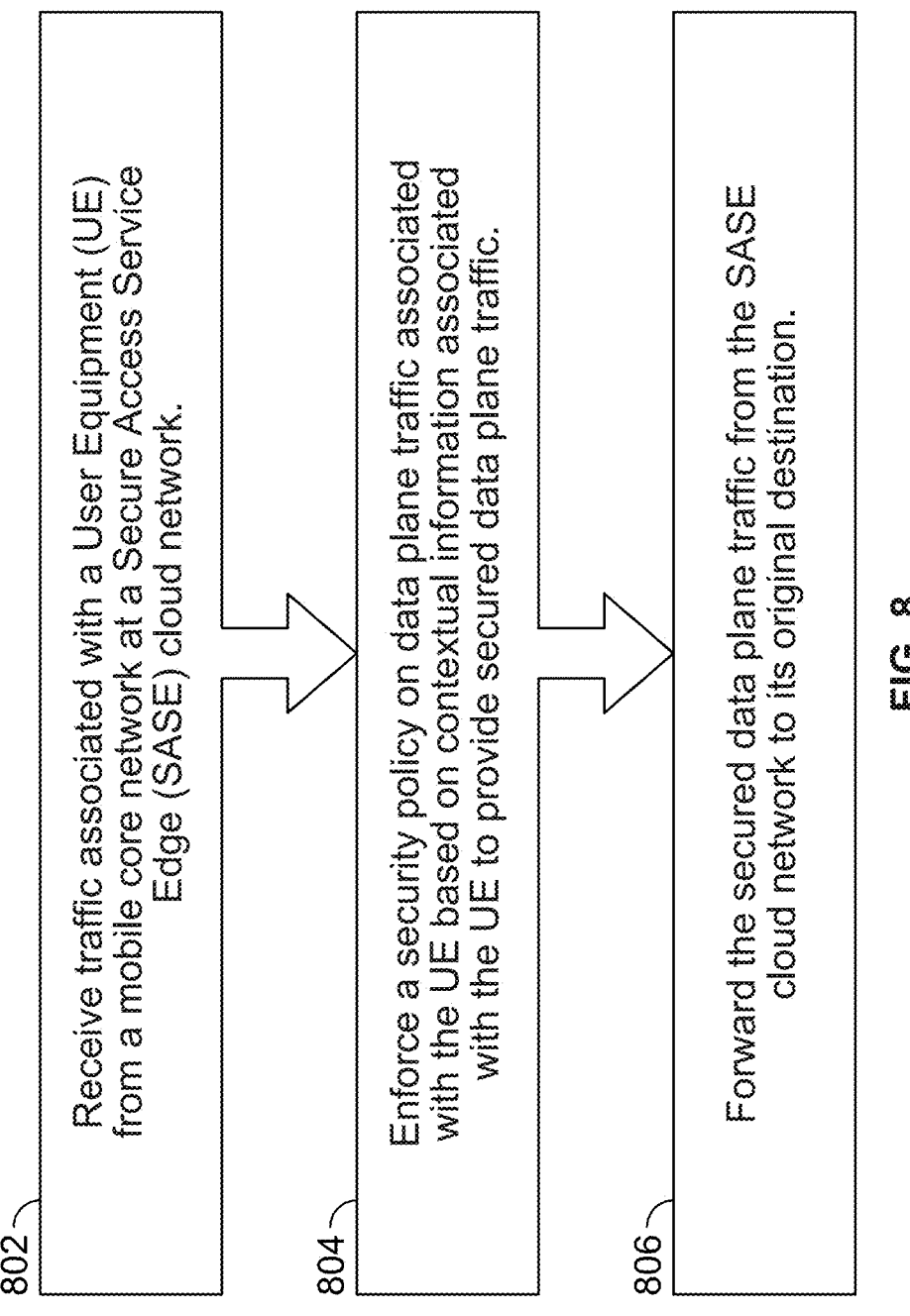

802 — Receive traffic associated with a User Equipment (UE) from a mobile core network at a Secure Access Service Edge (SASE) cloud network.

804 — Enforce a security policy on data plane traffic associated with the UE based on contextual information associated with the UE to provide secured data plane traffic.

806 — Forward the secured data plane traffic from the SASE cloud network to its original destination.

FIG. 8

SECURE ACCESS SERVICE EDGE FOR MOBILE NETWORKS

CROSS REFERENCE TO OTHER APPLICATIONS

This application claims priority to U.S. Provisional Patent Application No. 63/634,210 entitled SECURE ACCESS SERVICE EDGE FOR MOBILE NETWORKS filed Apr. 15, 2024, U.S. Provisional Patent Application No. 63/634, 219 entitled SECURE ACCESS SERVICE EDGE FOR MOBILE NETWORKS filed Apr. 15, 2024, and U.S. Provisional Patent Application No. 63/661,476 entitled SECURE ACCESS SERVICE EDGE SOLUTION FOR PROVIDING ENHANCED SECURITY FOR MOBILE NETWORKS filed Jun. 18, 2024, all of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRA WINGS

Various embodiments of the invention are disclosed in the following detailed description and the accompanying drawings.

FIG. 7 is a flow diagram of a process for providing SASE for mobile networks in accordance with some embodiments.

FIG. 8 is another flow diagram of a process for providing SASE for mobile networks in accordance with some embodiments.

DETAILED DESCRIPTION

Figure 1:
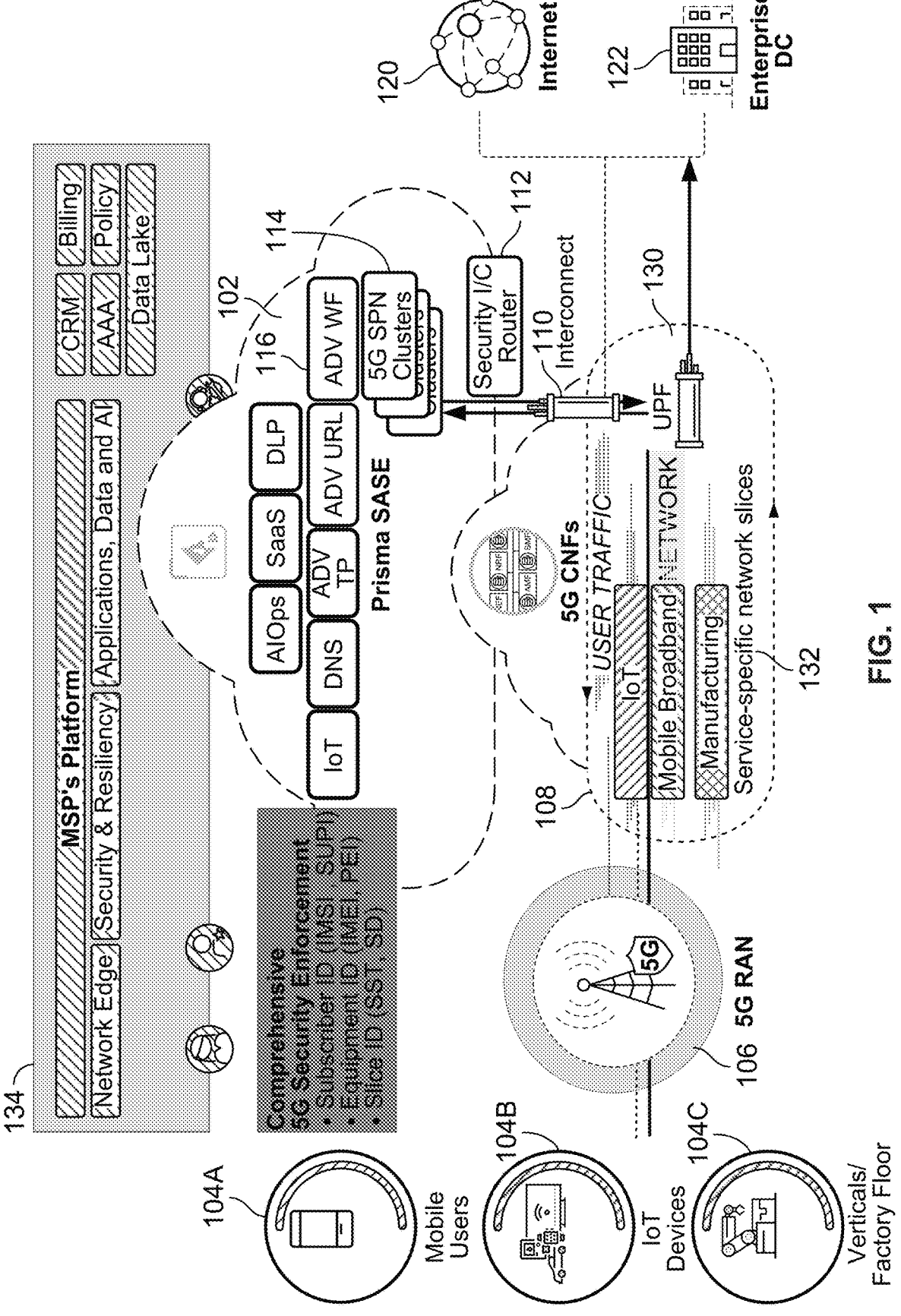
FIG. 1 is a block diagram of a Service Access Service Edge (SASE) solution for providing enhanced security for mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls, which can also be implemented using SD-WAN devices).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Security service providers also offer various commercially available cloud-based security solutions including various firewall, VPN, including Secure Access Service Edge (SASE), and various other security related services. For example, some security service providers have their own data centers in multiple geographies across the world to provide their customers such cloud-based security solutions.

Generally, a secure access service edge (SASE) brings together networking and network security services in a single cloud-based platform. This way, organizations can embrace cloud and mobility while reducing the complexity of dealing with multiple point products as well as saving IT, financial, and human resources.

For example, a SASE solution can generally include networking capabilities that an enterprise already uses. SASE can integrate the following networking features into a cloud-based infrastructure: SD-WAN edge devices, VPN services, and web proxying, which are each further described below.

Software-defined wide area network (SD-WAN) edge devices can provide easier connectivity for branch offices. With SASE, these devices are connected to a cloud-based infrastructure rather than to physical SD-WAN hubs located in other locations. By moving to the cloud, enterprises can eliminate the complexity of managing physical SD-WAN hubs and promote interconnectivity between branch offices.

Virtual private network (VPN) services incorporated by a SASE solution enable enterprises to route traffic through a VPN (e.g., using IPSec tunnels) to the SASE solution, and then to any application in the public or private cloud, delivered via Software as a Service (SaaS), or on the Internet. Traditional VPN was used for remote access to the internal data center, but it is typically not optimized for the current/evolving cloud computing environment.

Web proxying provides an alternate means of securely connecting users to applications by inspecting web-based protocols and traffic. Proxies were typically used for web security enforcement, but due to their inherent security limitations, they are now typically used as an architectural alternative for device traffic that cannot be fully inspected (e.g., personal devices that cannot accept an endpoint agent to force all web and non-web traffic through security inspection). When implemented as part of a SASE solution, proxies can offer organizations with legacy architectures an easier way of adopting the more robust security capabilities SASE has to offer.

In addition, SASE can incorporate the network security service tools enterprises have generally relied upon in prior computing environments. In a comprehensive SASE solution, the following security services can be delivered through a cloud-based infrastructure: zero trust network access (ZTNA), firewall/security as a service (FWaaS), secure web gateways (SWG), data loss prevention (DLP), and cloud access security broker (CASB), which are each further described below.

Zero Trust Network Access (ZTNA) applies the Zero Trust secure computing approach (e.g., never trust, always verify) to the cloud computing environment. For example, ZTNA can be applied to require that every user authenticate to access the cloud, restricting access and minimizing the risk of, for example, data loss. However, ZTNA solutions based on a software-defined perimeter (SDP) model can lack content inspection capabilities needed for consistent security protection for enterprises. Also, moving to a cloud-based SASE infrastructure can eliminate the complexity of connecting to a gateway. For example, users, devices, and apps can be identified no matter where they connect from, and the below further described ZTNA solutions of protecting applications can be applied across all services, including data loss prevention (DLP) and threat prevention.

Firewall as a service (FWaaS) provides next-generation firewall features in the cloud computing environment (e.g., also referred to herein as the cloud), thereby removing the need for physical hardware at branch and retail locations. For example, SASE solutions can integrate FWaaS into its cloud-based platform, allowing simplified management and deployment.

Overview of Techniques for Service Access Service Edge (SASE) for Mobile Networks Technical and security challenges with integration of mobile devices connecting via mobile networks (e.g., 4G/LTE, 5G, 6G, and later mobile devices) with Secure Access Service Edge (SASE) solutions.

Specifically, there exists a need for improved integration for mobile networks with SASE solutions as a Service.

Secure Access Service Edge (SASE) generally refers to providing converged network and security as a service capabilities, including Software Defined Wide Area Networking (SD-WAN), Secure Web Gateway (SWG), Cloud Access Security Broker (CASB), firewall as a service (e.g., using a Network Gateway Firewall (NGFW), which can be implemented using a VM-based or container-based firewall, such is in a cloud-based computing environment), and Zero Trust Network Access (ZTNA).

Specifically, what are needed are new and improved solutions for monitoring such network traffic and applying intelligent security for zero trust in mobile network environments using a SASE solution, such as for mobile devices (e.g., UEs) communicating over service provider networks (e.g., mobile networks associated with one or more service providers, such as AT&T, Verizon, etc.).

For example, there is a need for a seamless 4G/5G/6G Authentication & Authorization federation with service point (SP) Interconnect (e.g., cross connects from a service provider (SP) network into the hyperscaler clouds) to provide comprehensive and Secure Service Edge (SSE) solution for 4G/5G/6G devices in SASE solutions (e.g., Prisma Access is an example SASE solution that is commercially available from Palo Alto Networks, Inc., headquartered in Santa Clara, CA).

Accordingly, the disclosed techniques for providing SASE for mobile networks facilitate a system/process/computer program product for applying intelligent security for zero trust using a Service Access Service Edge (SASE) solution as will now be further described below.

For example, the disclosed techniques for providing SASE for mobile networks includes monitoring network traffic and applying intelligent security for zero trust for devices communicating via mobile network environments using a SASE solution, such as for mobile devices (e.g., UEs) connecting to and/or communicating over service provider networks (e.g., mobile networks associated with one or more service providers, such as AT&T, Verizon, etc.) for applying context-based and/or enhanced security in mobile networks based on subscriber-ID/International Mobile Subscriber Identity (IMSI)/Subscription Permanent Identifier (SUPI), equipment-ID/International Mobile Equipment Identity (IMEI)/Permanent Equipment Identifier (PEI), Network Slice ID/Single Network Slice Selection Assistance Information (S-NSSAI), User Equipment (UE) IP, Access Point Name (APN)/Data Network Name (DNN), and/or Radio Access Technology (RAT) Type information, IP to mobile subscriber traffic mappings, and/or other context-based information to facilitate enhanced security for such mobile devices communicating via mobile networks to access enterprise networks, applications including Software as a Service (SaaS)-based applications or other cloud based applications/services, and/or other Internet activities), such as will be further described below.

The disclosed techniques for providing SASE for mobile networks provides for a seamless integration with such service provider's mobile networks without requiring security equipment or software to be located in the service provider's core mobile networks, such as will be further described below.

In some embodiments, a system/process/computer program product for Service Access Service Edge (SASE) for mobile networks includes receiving traffic associated with a User Equipment (UE) from a mobile core network at a SASE cloud network; enforcing a security policy on data plane traffic associated with the UE based on contextual information associated with the UE to provide secured data plane traffic; and forwarding the secured data plane traffic from the SASE cloud network to the mobile core network, wherein the secured data plane traffic egresses the mobile core network for its original destination.

In some embodiments, a system/process/computer program product for Service Access Service Edge (SASE) for mobile networks includes receiving traffic associated with a User Equipment (UE) from a mobile core network at a SASE cloud network; enforcing a security policy on data plane traffic associated with the UE based on contextual information associated with the UE to provide secured data plane traffic; and forwarding the secured data plane traffic from the SASE cloud network to its original destination.

Specifically, SASE (e.g., using a firewall as a service entity) is configured to process mobile network traffic received over the interconnect from the core mobile network (e.g., independent of any particular mobile core network protocols; as control plane signaling can be provided, for example, via RADIUS, Diameter, or SP API gateway services, such as further described herein) to extract contextual information, which can include User Equipment (UE) IP, IMSI/SUPI (e.g., Subscriber-ID), IMEI/PEI, S-NSSAI, APN/DNN, S-NSSAI, RAT Type information, IP to mobile subscriber traffic mappings, and/or other context-based information. The security platform is further configured to apply a security policy (e.g., enforce one or more security rules) based on the contextual information.

The disclosed techniques for providing SASE for mobile networks facilitate a cloud native SASE stack and interconnect with core mobile network (e.g., a 4G/5G/6G/later mobile network core environment).

Also, the disclosed techniques for providing SASE for mobile networks facilitate an agentless solution (e.g., an agent is not required to be deployed on the 5G mobile device). An agent for roaming devices and non-cellular/non-SIM devices can be provided using various techniques, such as will be further described below.

In addition, the disclosed techniques for providing SASE for mobile networks facilitate context-based security for mobile devices/users without requiring additional security equipment or security software/entities within the core mobile network (e.g., 5G packet core network).

As such, the disclosed techniques for providing SASE for mobile networks facilitate a SASE-based solution for mobile network environments (e.g., macro 5G, private 5G, and/or hybrid environments) with consistent zero trust policies (e.g., based on IMSI/IMEI and/or other context information).

Further, the disclosed techniques for providing SASE for mobile networks facilitate a comprehensive multi-tenancy solution that can manage all 5G enterprise networks (e.g., with a single pane of glass).

Moreover, the disclosed techniques for providing SASE for mobile networks facilitate a global solution across all geo-locations worldwide and providing auto-scalability based on traffic volumes and customer growth by providing a seamless mobile core network interconnect integration with a hyperscaler SASE solution.

As an example use case, a cellular (e.g., 4G/5G/6G/later cellular network standards) mobile network service provider can utilize the disclosed techniques for providing SASE for their 5G network customers to offer enhanced security services as a managed service, such as to their enterprise customers that have 5G enterprise deployments and/or to their individual subscribers, such as for additional subscription fees for such enhanced security services.

As another example use case, a cellular (e.g., 4G/5G/6G/later cellular network standards) mobile network service provider can utilize the disclosed techniques for providing SASE for their own internal enterprise users for enhanced security services to protect/safeguard their internal enterprise users on their mobile network activities.

For example, the disclosed techniques for providing SASE for mobile networks can facilitate applying intelligent security for zero trust for mobile networks (e.g., based on an extracted Subscriber-ID and/or other contextual information) using a SASE environment in communication with a core mobile network via the cloud-to-cloud interconnect, such as further described below.

As yet another example, the disclosed techniques for providing SASE for mobile networks can facilitate applying intelligent security for zero trust for mobile networks including providing 5G subscriber/user and/or 5G equipment/device level known and unknown threat identification and prevention for 5G mobile network environments.

As yet a further example, the disclosed techniques for providing SASE for mobile networks can facilitate applying intelligent security for zero trust for mobile networks including providing 5G subscriber/user and/or 5G equipment/device level application security for 5G mobile network environments.

As a final example, the disclosed techniques for providing SASE for mobile networks can facilitate applying intelligent security for zero trust for mobile networks providing 5G subscriber/user and/or 5G equipment/device level URL filtering for 5G mobile network environments.

Moreover, service providers and enterprises can utilize the disclosed techniques applying security for zero trust in mobile networks using a SASE solution to apply subscriber-ID based security over IP-based external network (e.g., similar to the Internet) perimeters.

Accordingly, new and improved security solutions that facilitate applying security (e.g., network-based security) for zero trust in a 5G Service Access Service Edge (SASE) environment (e.g., the security platform can be implemented using a firewall (FW)/Next Generation Firewall (NGFW), a network sensor acting on behalf of the firewall, or another (virtual) device/component that can implement security policies using the disclosed techniques, including, for example, Palo Alto Networks' Prisma Access Secure Service Edge (SSE), Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) (e.g., a 5G/later versions of mobile networks), and in some cases, on various interfaces (e.g., N6, etc.) and protocols (e.g., PFCP, RADIUS, Diameter, etc.) in mobile network environments are disclosed in accordance with some embodiments.

These and other embodiments and examples for applying intelligent security for zero trust for mobile networks using a Service Access Service Edge (SASE) solution will be further described below.

Example System Architectures for Service Access Service Edge (SASE) For Mobile Networks Accordingly, in some embodiments, the disclosed techniques for SASE for mobile networks (e.g., such as for applying intelligent security for zero trust in mobile networks) can be provided using security platforms (e.g., the security function(s)/platform(s) can be implemented using Palo Alto Networks' Prisma Access Secure Service Edge (SSE), a firewall (FW)/Next Generation Firewall (NGFW), a network sensor acting on behalf of the firewall, or another (virtual) device/component that can implement a firewall as a service entity for enforcing one or more security policies using the disclosed techniques, such as PANOS executing on a virtual/physical NGFW solution commercially available from Palo Alto Networks, Inc. or another security platform/NGFW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques, including using SD-WAN devices and/or clusters executing firewall as a service entities) are configured to provide deep packet inspection (DPI) capabilities (e.g., including stateful inspection) of, for example, user/subscriber sessions (e.g., user/subscriber traffic) provided to the SASE solution via an interconnect (e.g., a cloud-to-cloud interconnect, such as from a Google Cloud Platform (GCP) cloud-based environment for the service provider's core mobile network in to a SASE cloud-based environment) to apply security on traffic in mobile networks based on a policy (e.g., layer-7 security and/or other security policy enforcement) as further described below.

Specifically, as will now be described with respect to various system embodiments, context-based security can be applied to mobile device related traffic (e.g., 4G/5G/6G/later related mobile network traffic) using a SASE solution, such as will be further described below with respect to various embodiments. In an example implementation, context-based security can be applied using SASE to such traffic passing thru mobile networks based on one or more of the following: a subscriber/user including IMSI, IMEI, RAT type, Network Slice, DNN/APN, location, user IP, and/or other contextual information.

FIG. 1 is a block diagram of a Service Access Service Edge (SASE) solution for providing enhanced security for mobile networks in accordance with some embodiments. The disclosed techniques for providing a SASE solution for mobile networks is shown in FIG. 1 with respect to a 5G mobile network environment. However, it would be apparent to one of ordinary skill in the art that the disclosed techniques can similarly be applied to various other example mobile service provider environments, such as 4G/5G/6G or later mobile network environments.

Specifically, FIG. 1 illustrates an example architecture for interconnecting 5G mobile network cloud-based environment as shown at 108 (e.g., including 5G Cloud Native Network Functions (CNFs)) with a SASE cloud-based environment as shown at 102 (e.g., shown as a Prisma SASE hyperscaler cloud-based solution in this example, which is a commercially available SASE solution from Palo Alto Networks, Inc., headquartered in Santa Clara, CA, and/or other available SASE solution can similarly be used) using a cloud-to-cloud interconnect 110. In an example implementation, a Google Cloud Platform (GCP) Partner interconnect can be used to connect the 5G mobile network cloud (108) with the Prisma SASE cloud (102) (e.g., or for other available cloud-based computing environments, such as Amazon Web Services (AWS), Microsoft Azure, etc., other cloud-based interconnects provided for those cloud-based computing environments can similarly be used). Specifically, the GCP Partner Interconnect connection (e.g., as shown at 110 in FIG. 1) can be used for securely passing traffic between these cloud-based network environments 102 and 108.

Referring to SASE cloud 102, 5G Security Processing Nodes (SPN) clusters 114 provide firewall entities, specifically, firewalls as a service, for implementing the disclosed enhanced, context-based security for mobile devices connecting to the core 5G network shown at 108 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques via these firewall as a service entities) as further described below.

As referred to herein, IMSI is the concept referred to by ITU-T as the "International Mobile Subscription Identity." IMSI is a 14 or 15 digit number.

As also referred to herein, SUPI is a globally unique 5G "Subscription Permanent Identifier" allocated to each subscriber in the 5G system. As per 3GPP T.S 23.003 version 16.9.0, a SUPI type may indicate an IMSI, a network access identifier (NAI), a Global Line Identifier (GLI), or a Global Cable Identifier (GCI).

As also referred to herein, International Mobile Equipment Identifier (IMEI) is defined in 3GPP TS 23.003 available at https://portal.3gpp.org/desktopmodules/Specifications/SpecificationDetails.aspx?specificationId=729.

As shown in FIG. 1, the 5G mobile network environment can also include a 5G Radio Access Network (RAN) access as shown at 106, and/or other networks including, for example, Wi-Fi access and Fixed access (not shown), to facilitate data communications for subscribers (e.g., using User Equipment (UE), such as smart phones, laptops, computers (which may be in a fixed location), including for mobile users 104A, Internet of Things (IoT) devices 104B, and/or other cellular enabled computing devices/equipment including verticals/factor floor devices (e.g., Industrial IoT (IIoT), Commercial IoT (CIoT)) as shown at 104C, and/or other network communication enabled devices, including over a Packet Data Network (PDN) (e.g., the Internet) 120 to access various applications, web services, content hosts, etc. and/or other networks) as well as to enterprise networks, such as for an enterprise data center (DC) as shown at 122.

As also shown in FIG. 1, a User Plane Function (UPF) 130 in the core mobile network 108 is in communication with Interconnect 110 for passing mobile device/user related traffic (e.g., including user plane traffic associated with any connected UEs) to the SASE environment 102 as similarly described above. UPF 130 is also in communication with enterprise DC 122 as well as the Internet 120 via the Interconnect shown at 110.

Specifically, the security is provided for the mobile device/user related traffic by passing the traffic from the core mobile network (108) via the Interconnect (110) to the firewall as a service entities, shown as 5G SPN clusters 114, via a security interconnect (I/C) router 112 as shown in FIG. 1. In an example implementation, the security I/C router can provide layer-3 Border Gateway Protocol (BFG) routing from the Interconnect 110 to the 5G SPN clusters 114 to facilitate connections (e.g., including cross-connects for dynamic load balancing, etc.) on a region by region basis (e.g., North American cloud environments can be connected, European cloud environments can be connected, and Asian cloud environments can be connected, and/or other regions or smaller divisions of regions, such as by country within Asia and country within Europe, or Eastern United States, Central United States, Western United States, etc.). As such, the firewall as a service can perform the disclosed enhanced, context based security on such mobile device/user related traffic without having to locate the security/firewall entities within the 5G core mobile network, which is often preferred by the mobile network service providers (e.g., for latency and/or other technical reasons, mobile network service providers/mobile service providers (MSPs) may not want to deploy 3$^{rd}$ party vendor security services/equipment in the MSP's 5G mobile core network).

As will be further described below, this interconnect between the SASE cloud and the 5G core network cloud facilitates an effective and efficient mechanism for using the SASE solution to facilitate enhanced security for the mobile device/user traffic passing through the core mobile network (e.g., based on UE IP, IMEI, IMSI, location network slice, RAT information, and/or other contextual information as will be further described below). For example, the core mobile network can provide service-specific network slices as shown at 132, which can be used as contextual information for applying distinct security enforcement based on those different network slices when the mobile device/ network traffic is passed to the SASE for security policy enforcement using the firewall as a service entities, 5G SPN clusters 114.

In some embodiments, the firewall as a service entities provided via 5G SPN clusters 114 are configured to provide the following DPI capabilities: DPI of Packet Forwarding Control Protocol (PFCP) traffic (e.g., and/or other protocol formatted network traffic) received via the security I/C router 112 from the Interconnect 110. In an example implementation, the firewall as a service entities are configured to provide DPI capabilities (e.g., including to identify a UE IP, IMSI/SUPI, IMEI/PEI, S-NSSAI, APN/DNN, and/or RAT Type information, application (App) ID, etc.) of, for example, PFCP messages that pass through, for example, the N6 and/or other interfaces between UPF and other 5G core mobile network entities within the core mobile network environment 108 to apply context-based security traffic based on a policy (e.g., layer-7 security and/or other security policy enforcement) as further described below.

In some embodiments, a SP Interconnect (SPI) is provided if the SP has a separate internet breakout PoPs from their mobile packet core network such that network traffic (e.g., including control plane traffic) is provided from the SP mobile packet core network to the SASE cloud network environment for the SPI as similarly described above.

Specifically, in this example implementation, the firewall as a service entities provided via 5G SPN clusters 114 are configured to add an entry of the UE IP and contextual information, such as IMSI, IMEI, S-NSSAI related to this subscriber/user (e.g., user ID) in a data store (not shown) (e.g., a database, such as an SQL or other type of commercially available database). In this example implementation, the firewall as a service entities receive signaling message(s) from the 5G core mobile network (e.g., via an out-of-band) communication channel (e.g., using a Radius protocol, a Diameter protocol, and/or another protocol can similarly be used, such as via a proxy entity, such as the mobile core AAA entity) as part of a mobile user/device (UE) initial connection and authentication with the 5G core mobile network. This signal message communication can include, for example, a UE IP address (UE IP), mobile phone number, IMSI, IMEI, location, APN/DNN, RAT, and/or other contextual information associated with the mobile device/user. Similarly, the core mobile network can also provide another message when the mobile device/user disconnects from the core mobile network, and then the SASE solution/firewall as a service entity/ies can remove the relevant entry of the UE IP and related context information from the database. In another example implementation, such out-of-band message communications can similarly be implemented using Application Programming Interfaces (APIs) (e.g., RESTful APIs) for secure communications between the 5G core network cloud and the SASE cloud.

In one embodiment, the disclosed 5G SASE techniques rely on the 5G packet core mobile network for interpreting the PFCP messages and sending the summarized information (e.g., including various associated contextual information as described herein) via a communication mechanism (e.g., RADIUS accounting messages, DIAMETER messages, another protocol can be similarly used, and/or an API communication mechanism can be similarly used) to the 5G SASE solution.

In another embodiment, the security platform is configured to utilize DPI to extract various contextual information from monitored 5G packet core mobile network protocols, which can include, for example, removing the entry of a UE IP and related contextual information from the database if either of the following events occur based on the monitoring of the PFCP protocol: (1) a PFCP session deletion request/ response message to delete the PFCP control session; and (2) user/subscriber session(s) timeout message (e.g., such timeouts can be configurable). More specifically, in this example implementation in which the security platform is configured to utilize DPI to extract various contextual information from monitored 5G packet core mobile network protocols, the firewall as a service entities provided via 5G SPN clusters 114 are configured to monitor PFCP messages including the following: (1) a PFCP Session Establishment Procedure (e.g., as per 3GPP T.S 29.244 v 18.3.0 (e.g., which is publicly available at https://portal.3gpp.org/desk-topmodules/Specifications/SpecificationDetails.aspx?speci-ficationId=3111), a PFCP Session Establishment procedure shall be used to set up a PFCP session between a CP function and a UP function and configure Rules in the UP function so that the UP function can handle incoming packets); (2) a PFCP Session Modification Procedure (e.g., the PFCP Session Modification procedure shall be used to modify an existing PFCP session, e.g., to configure a new rule, to modify an existing rule, to delete an existing rule); and (3) a PFCP Session Deletion Procedure (e.g., the PFCP Session Deletion procedure shall be used to delete an existing PFCP session between the CP function and the UP function) to facilitate extraction of the above-described contextual information.

In this example implementation, the firewall as a service entities provided via 5G SPN clusters 114 are configured to provide various enhanced, context-based security based on the monitored user plane data traffic flows received via the Interconnect at the mapped firewall as a service entity/ies (e.g., to setup the flow information for each new UE connection to the 5G core mobile network). The data traffic flows (e.g., sessions) can be correlated based on the source IP address for the data traffic flows the relevant UE IP received and stored above to associate such data traffic flows to the relevant context information associated with the UE IP. The firewall as a service entity/ies can then select and apply a security policy to each data traffic flow using the relevant contextual information for each such data traffic flow.

As such, the disclosed techniques for providing SASE for mobile networks facilitate a cloud native SASE stack with SIM-based authentication, federation, and interconnect with core mobile network (e.g., a 4G/5G/6G/later mobile network core environment).

In this example implementation, the firewall as a service entities provided via 5G SPN clusters 114 are configured to provide various SASE related services, including, as shown in FIG. 1, Artificial Intelligence powered Operations (AIOps), Software as a Service (SaaS) secure and high-speed connections (e.g., for SalesForce, Microsoft Office 365, and/or other SaaS solutions), Data Loss Prevention (DLP) security, IoT security, Domain Name System (DNS) security, Advanced Threat Protection (ATP) security, Advanced Uniform Resource Link (URL) security, and/or other SASE/security related services.

In addition, the firewall as a service entities provided via 5G SPN clusters 114 can also be in network communication with a Cloud Security Service 116 (e.g., a commercially available cloud-based security service, such as the Wild-Fire™ (ADV WF) cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the security platforms with dynamic prevention signatures for malware, DNS, URLs, CNC malware, and/or other malware as well as to receive malware samples for further security analysis.

Specifically, in this example implementation, the firewall as a service entities provided via 5G SPN clusters 114 are configured to apply the above-described context-based security policy enforcement to the mobile traffic (e.g., mobile device/user traffic, such as for each inspected/monitored session/flow) that is received via the Interconnect 110 and then pass the mobile traffic (e.g., secured/clean mobile traffic) back to the mobile core network 108 for routing (e.g., egress) from the mobile core network to a destination for the mobile traffic (e.g., for each session/flow), such as from UPF 130 to the Internet 120 (e.g., for SaaS applications and/or other applications/services, etc.) and/or to the Enterprise DC 122 (e.g., for on-premises applications/services, etc.).

As also shown in FIG. 1, the disclosed techniques using the SASE to mobile core cloud interconnect solution also facilitates a seamless integration of the SASE solution with the mobile network managed service provider's (MSP's) platform that includes billing systems, Authentication, Authorization, and Accounting (AAA), policy, data lake related systems and storage services and/or other MSP platform related infrastructure such as shown at 134.

As an example use case, a cellular (e.g., 4G/5G/6G/later cellular network standards) mobile network service provider can utilize the disclosed techniques for providing SASE for their 5G network customers to offer enhanced security services as a managed service, such as to their enterprise customers that have 5G enterprise deployments and/or to their individual subscribers, such as for additional subscription fees for such enhanced security services.

As another example use case, a cellular (e.g., 4G/5G/6G/later cellular network standards) mobile network service provider can utilize the disclosed techniques for providing SASE for their own internal enterprise users for enhanced security services to protect/safeguard their internal enterprise users on their mobile network activities.

Figure 2:
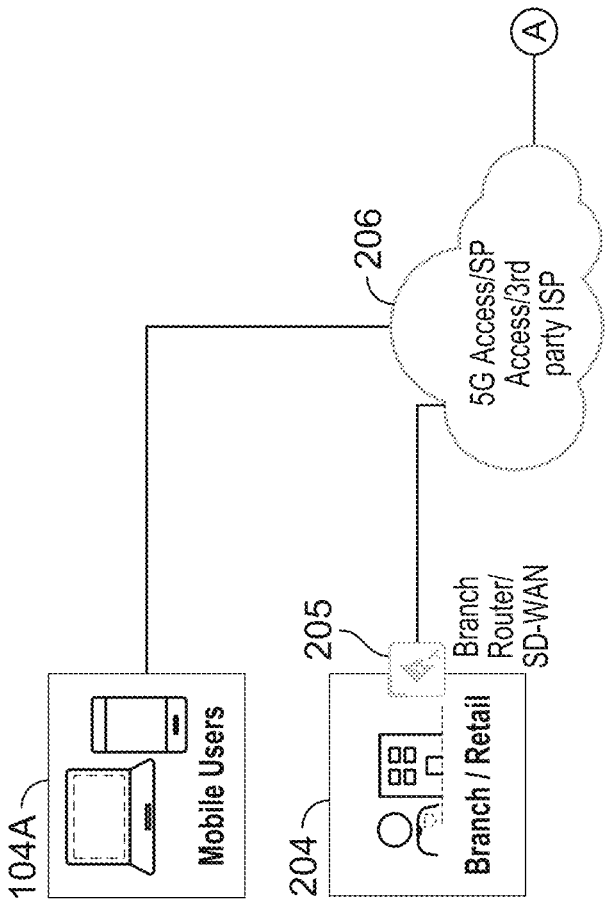
FIG. 2 is another block diagram of a SASE solution for providing enhanced security for mobile networks in accordance with some embodiments.
Figure 2:
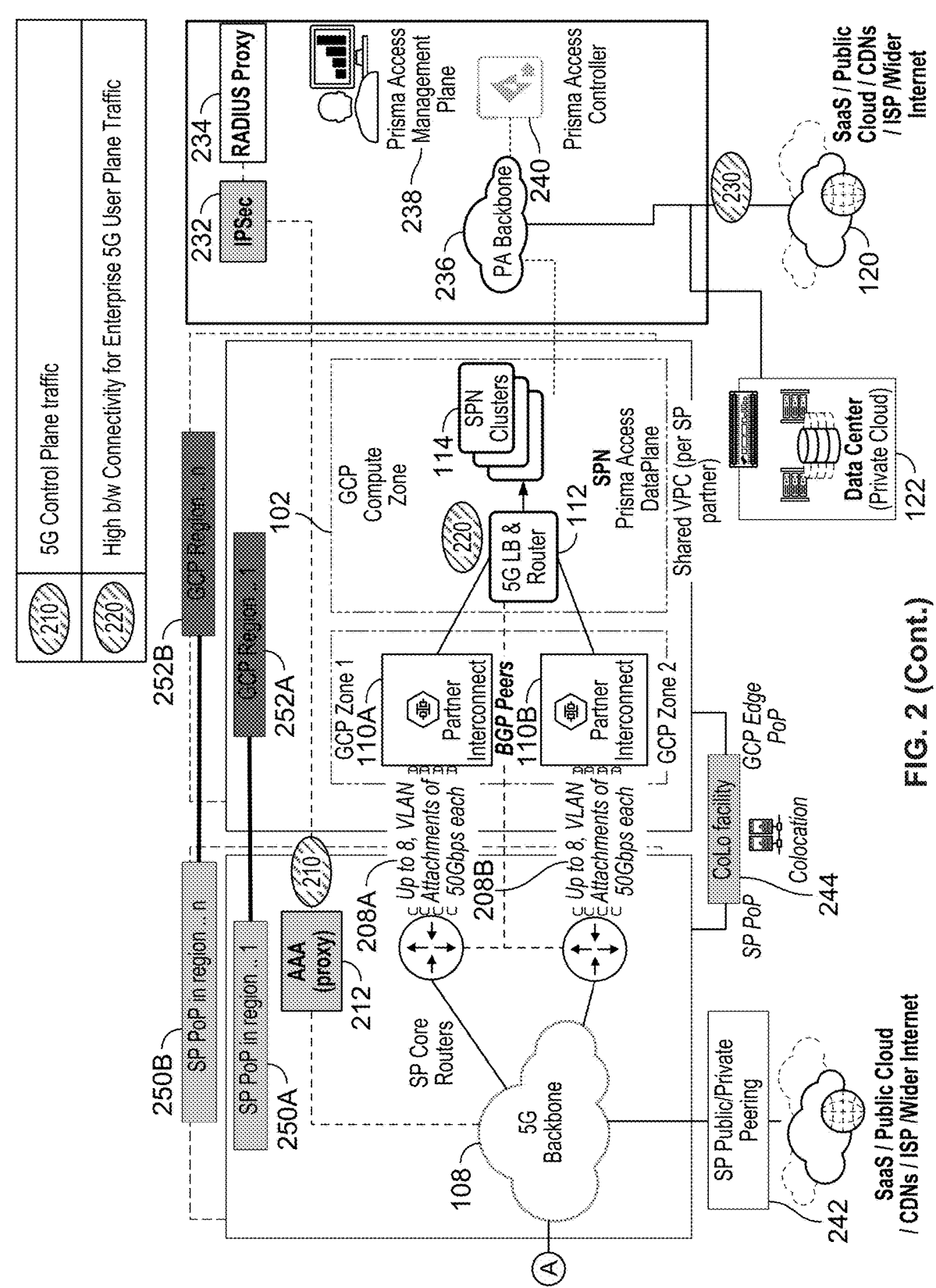

FIG. 2 is another block diagram of a SASE solution for providing enhanced security for mobile networks in accordance with some embodiments. The disclosed techniques for providing a SASE solution for mobile networks are similarly shown in FIG. 2 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

FIG. 2 illustrates an example architecture that is generally similar to that shown and described above with respect to FIG. 1. However, unlike FIG. 1, in which the SASE applies security to the user plane (UP) traffic and then passes the filtered/clean UP traffic back to the 5G core mobile network cloud 108, in this example implementation, the SASE applies security to the UP traffic and then forwards the filtered/clean UP traffic to its original destination (e.g., SaaS applications/services on the Internet and/or data center (private cloud)), such as will be further described below.

Specifically, FIG. 2 illustrates an example architecture for interconnecting 5G mobile network cloud-based environment as shown at 108 (e.g., including a 5G backbone) with a SASE cloud-based environment as shown at 102 (e.g., shown as a Prisma Access data plane for a Prisma SASE hyperscaler cloud-based solution in this example, which is a commercially available SASE solution from Palo Alto Networks, Inc., headquartered in Santa Clara, CA, and/or other available SASE solution can similarly be used) using, in this example implementation, two cloud-to-cloud interconnects shown as 110A and 110B. As similarly described above with respect to FIG. 1, in an example implementation, a Google Cloud Platform (GCP) Partner interconnect can be used to connect the 5G mobile network cloud (108) with the Prisma SASE cloud (102) (e.g., or for other available cloud-based computing environments, such as Amazon Web Services (AWS), Microsoft Azure, etc., other cloud-based interconnects provided for those cloud-based computing environments can similarly be used). Specifically, the GCP Partner Interconnect connection (e.g., as shown at 110 in FIG. 1 and as 110A and 110B in FIG. 2) can be used for securely passing traffic between these cloud-based network environments 102 and 108. As also shown in FIG. 2, two data pipes 208A and 208B facilitate communication of network traffic from the 5B backbone via service provider (SP) core routers to the Partner interconnects 110A and 110B respectively using BGP peers for network traffic routing as similarly described above with respect to FIG. 1.

Referring to SASE cloud 102, 5G Service Principal Name (SPN) clusters 114 provide firewall entities, specifically, firewalls as a service, for implementing the disclosed enhanced, context-based security for mobile devices connecting to the core 5G network shown at 108 as similarly described above with respect to FIG. 1 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques via these firewall as a service entities) and as further described below.

As similarly described above with respect to FIG. 1, the 5G mobile network environment can also include a 5G Radio Access Network (RAN) access (not shown in FIG. 2), and/or other networks including, for example, Wi-Fi access and Fixed access, such as a branch/retail office/location as shown at 204 via a branch router 205 (e.g., an SD-WAN) over a 5G access/Service Provider (SP) access/3$^{rd}$ party Internet Service Provider (ISP) 206, to facilitate data communications for subscribers (e.g., using User Equipment (UE), such as smart phones, laptops, computers (which may be in a fixed location), including for mobile users 104A, Internet of Things (IoT) devices (not shown in FIG. 2), and/or other cellular enabled computing devices/equipment including verticals/factor floor devices (e.g., Industrial IoT (IIoT), Commercial IoT (CIoT)) (not shown in FIG. 2), and/or other network communication enabled devices, including over a Packet Data Network (PDN) (e.g., the Internet) 120 to access various applications, web services, content hosts, etc. and/or other networks) as well as to enterprise networks, such as for an enterprise data center (DC) as shown at 122.

As also shown in FIG. 2, a SP public/private peering access 242 is in communication with the 5G backbone 108 (e.g., for SaaS/public cloud/content data networks (CDNs)/ISP/Wider Internet access). In addition a colocation (colo) facility 244 is in communication with the 5G backbone 108 via a SP Point of Presence (PoP) and is also in communication with the SASE cloud environment via a GCP Edge PoP as shown in FIG. 2.

Specifically, as shown at 210, 5G control plane (CP) traffic is provided from a AAA entity in the 5G mobile core network (e.g., a AAA proxy) via an IPSec tunnel 232 to a RADIUS proxy 234 (e.g., or a DIAMETER proxy, or another protocol, or API, related solution can similarly be used) to facilitate access to control plane traffic for the SASE solution. As shown in FIG. 2, the IPSec and RADIUS proxy can be deployed in each GCP Region to facilitate a hyperscaler SASE solution as further described herein.

Also, as shown at 220 in FIG. 2, high bandwidth (b/w) connectivity for enterprise 5G user plane (UP) traffic is provided to facilitate applying security for the mobile device/user and/or branch/retail device/user related traffic by passing the traffic from the core mobile network (108) via the Interconnect (110) to the firewall as a service entities, shown as 5G SPN clusters 114, via a security interconnect (I/C) router 112 as shown in FIG. 1. In an example implementation, the security I/C router can provide layer-3 Border Gateway Protocol (BFG) routing from the Interconnects 110A and 110B to the 5G SPN clusters 114 to facilitate connections (e.g., including cross-connects for dynamic load balancing, etc.) on a region by region basis, such as shown at 250A and 252B and 250B and 252B (e.g., North American cloud environments can be connected, European cloud environments can be connected, and Asian cloud environments can be connected, and/or other regions or smaller divisions of regions, such as by country within Asia and country within Europe, or Eastern United States, Central United States, Western United States, etc.). As such, the firewall as a service can perform the disclosed enhanced, context based security on such mobile device/user related traffic without having to locate the security/firewall entities within the 5G core mobile network, which is often preferred by the mobile network service providers (e.g., for latency and/or other technical reasons).

As further shown in FIG. 2 at 230, the UP traffic that has passed through the SPN clusters 114 and had security policy applied based on contextual information as similarly described above, passes through the SASE backbone 236 (e.g., in this example implementation, the Prisma Access (PA) backbone) and then forwards the filtered/clean UP traffic to its original destination to the Internet 120 or the Data Center (private cloud) 122 as shown. As such, unlike FIG. 1, in which the SASE applies security to the UP traffic and then passes the filtered/clean UP traffic back to the 5G core mobile network cloud 108, in this example implementation, the SASE applies security to the UP traffic and then forwards the filtered/clean UP traffic to its original destination (e.g., SaaS applications/services on the Internet and/or data center (private cloud)).

As also shown in FIG. 2, the SASE cloud includes a management plane 238 (e.g., a Prisma Access management plane in this example implementation) and a SASE controller 240 (e.g., a Prisma Access controller) in communication with the SASE backbone 236 for SASE administrative control and management.

As will be further described below, this interconnect between the SASE cloud and the 5G core network cloud facilitates an effective and efficient mechanism for using the SASE solution to facilitate enhanced security for the mobile device/user traffic passing through the core mobile network (e.g., based on UE IP, IMEI, IMSI, location network slice, RAT information, and/or other contextual information as will be further described below). For example, the core mobile network can provide service-specific network slices (e.g., as similarly shown at 132 in FIG. 1), which can be used as contextual information for applying distinct security enforcement based on those different network slices when the mobile device/network traffic is passed to the SASE for security policy enforcement using the firewall as a service entities, 5G SPN clusters 114.

Specifically, in this example implementation, the firewall as a service entities provided via 5G SPN clusters 114 are configured to add an entry of the UE IP and contextual information, such as IMSI, IMEI, S-NSSAI related to this subscriber/user (e.g., user ID) in a data store (not shown) (e.g., a database, such as an SQL or other type of commercially available database). In this example implementation, the firewall as a service entities receive signaling message(s) from the 5G core mobile network (e.g., via an out-of-band) communication channel (e.g., using a Radius protocol, a Diameter protocol, and/or another protocol can similarly be used, such as via a proxy entity, such as the mobile core AAA entity (proxy) as shown at 212 in FIG. 2 that is in secure (IPSec) communication with a Radius proxy (or a DIAMETER/other proxy, or a (RESTful) API implementation, can similarly be used) as shown at 234 in FIG. 2) as part of a mobile user/device (UE) initial connection and authentication with the 5G core mobile network. This signal message communication can include, for example, a UE IP address (UE IP), mobile phone number, IMSI, IMEI, location, APN/DNN, RAT, and/or other contextual information associated with the mobile device/user. Similarly, the core mobile network can also provide another message when the mobile device/user disconnects from the core mobile network, and then the SASE solution/firewall as a service entity/ies can remove the relevant entry of the UE IP and related context information from the database. In another example implementation, such out-of-band message communications can similarly be implemented using Application Programming Interfaces (APIs) (e.g., RESTful APIs) for secure communications between the 5G core network cloud and the SASE cloud.

In this example implementation, the firewall as a service entities provided via 5G SPN clusters 114 are configured to provide various enhanced, context-based security based on the monitored user plane data traffic flows received via the Interconnect at the mapped firewall as a service entity/ies (e.g., to setup the flow information for each new UE connection to the 5G core mobile network). The data traffic flows (e.g., sessions) can be correlated based on the source IP address for the data traffic flows the relevant UE IP received and stored above to associate such data traffic flows to the relevant context information associated with the UE IP. The firewall as a service entity/ies can then select and apply a security policy to each data traffic flow using the relevant contextual information for each such data traffic flow.

In addition, the firewall as a service entities provided via 5G SPN clusters 114 can also be in network communication with a Cloud Security Service (CSS) (not shown in FIG. 2, but can be provided as shown at 116 in FIG. 1 as similarly described above with respect to FIG. 1) (e.g., a commercially available cloud-based security service, such as the WildFire™ (ADV WF) cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, the CSS can be utilized to provide the security platforms with dynamic prevention signatures for malware, DNS, URLs, CNC malware, and/or other malware as well as to receive malware samples for further security analysis.

In an example implementation, the UE user/data plane traffic can be encapsulated (e.g., using a Geneve tunnel or another encapsulation technique) with meta information (e.g., including IMSI, IMEI, APN/DNN, location, network slice, RAT, and/or other contextual information). As described above, user/data plane traffic can be correlated with such contextual information based on the UE IP associated with the traffic and the stored contextual information received from the control plane traffic for that UE associated with that UE IP address during an initial connection with the 5G mobile network.

As such, the disclosed techniques for providing SASE for mobile networks facilitate a cloud native SASE stack with SIM-based authentication, federation, and interconnect with core mobile network (e.g., a 4G/5G/6G/later mobile network core environment).

Figure 3:
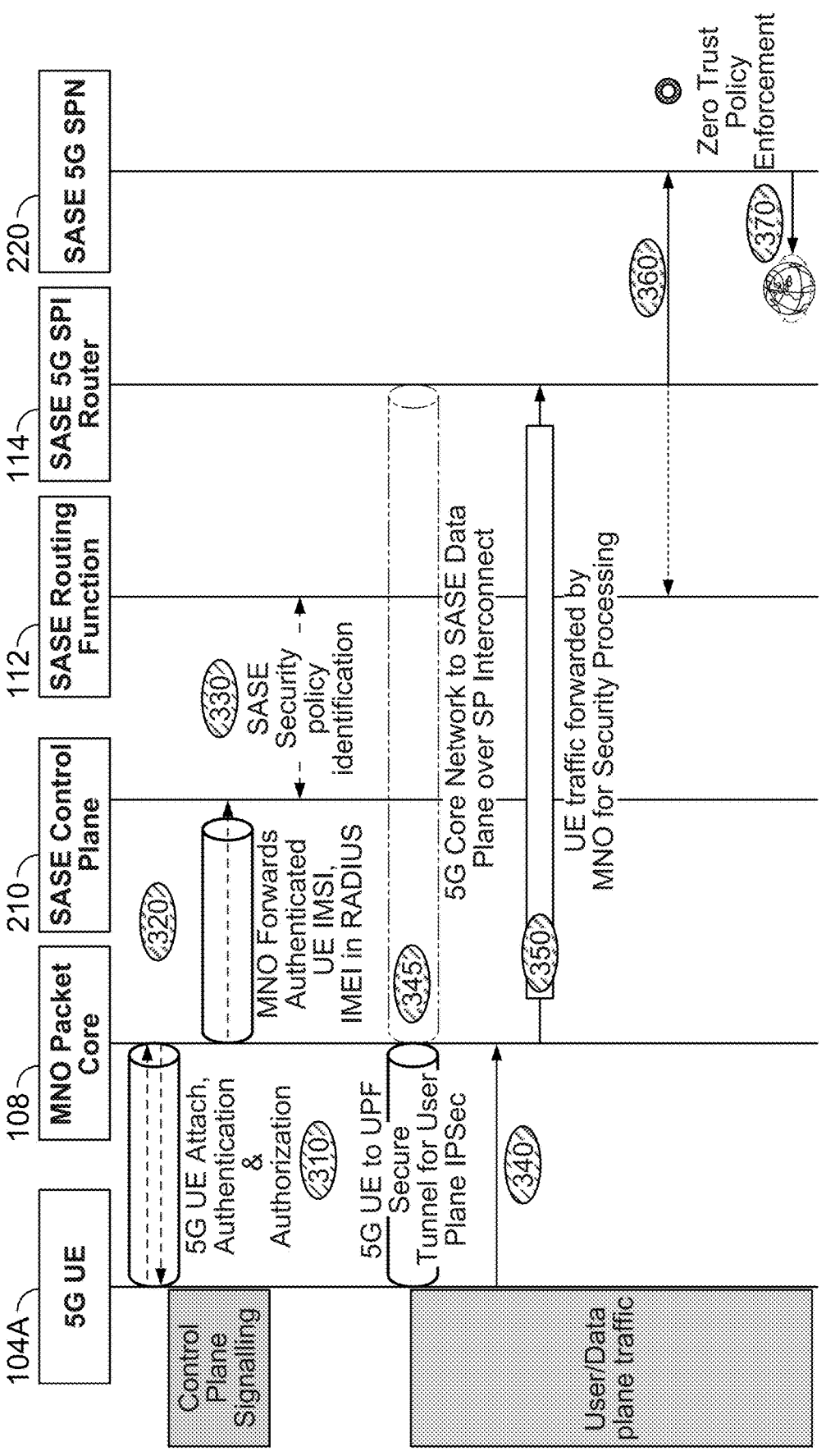
FIG. 3 is a sequence diagram for providing a SASE solution for mobile networks in accordance with some embodiments.

FIG. 3 is a sequence diagram for providing a SASE solution for mobile networks in accordance with some embodiments. Specifically, the call flow illustrated in the sequence diagram of FIG. 3 can be implemented using the architecture shown in FIG. 1 as similarly described above.

Referring to the control plane (CP) call flow shown in FIG. 3, at 310, a 5G UE 104A attaches to a AAA entity in a 5G packet core network of a Mobile Network Operator (MNO) 108. This communication is CP signaling traffic as shown in FIG. 3. At 320, the MNO forwards the authenticated UE including the IP address (UE IP), IMSI, and IMEI associated with the UE (e.g., and/or other contextual information associated with the UE, such as location, APN/DNN, network slice, etc.) in RADIUS to a SASE control plane 210. At 330, a SASE security policy is identified using a SASE routing function 112. For example, the security policy can be determined/selected based on the UE IP, IMSI, IMEI, and/or other contextual information associated with the UE as similarly described above. As an example, the security policy for a given tenant/customer (e.g., mobile service provider (MSP) enterprise tenant) can be selected for the UE based on the relevant contextual information. As also described herein, UE traffic associated with distinct tenants (e.g., based on a customer ID) can be separated for security processing using the disclosed SASE solution for mobile networks.

Referring to the user/data plane (UP) call flow shown in FIG. 3, at 340, the 5G UE 104A is connected to the UPF via a secure tunnel for user plane (UP) traffic (e.g., using an IPSec tunnel). The 5G core network is then securely connected to the SASE data plane over the service provider (SP) interconnect to the SASE 5G SPI router 114 as shown at 345 and as similarly described above. At 350, the UE traffic is forwarded by the MNO for security processing from the MNO packet core 108 to the SASE 5G SPI router 114. At 360, the data plane traffic is forwarded from the SASE 5G SPI router 114 back to the SASE 5G service provider network (SPN) after applying zero trust policy enforcement based on contextual information associated with the UE traffic, such as similarly described above with respect to FIG. 1. Alternatively, the traffic could egress the SASE network as similarly described above with respect to FIG. 2. As such, both solutions can be supported using the disclosed 5G SASE techniques, that is, traffic egressing out of the 5G SASE network as well as returning the traffic back to the 5G packet core, such as similarly described herein with respect to various embodiments. At 370, the UE traffic is forwarded to its original destination, such as the Internet and/or an enterprise data center, as similarly described above.

Figure 4:
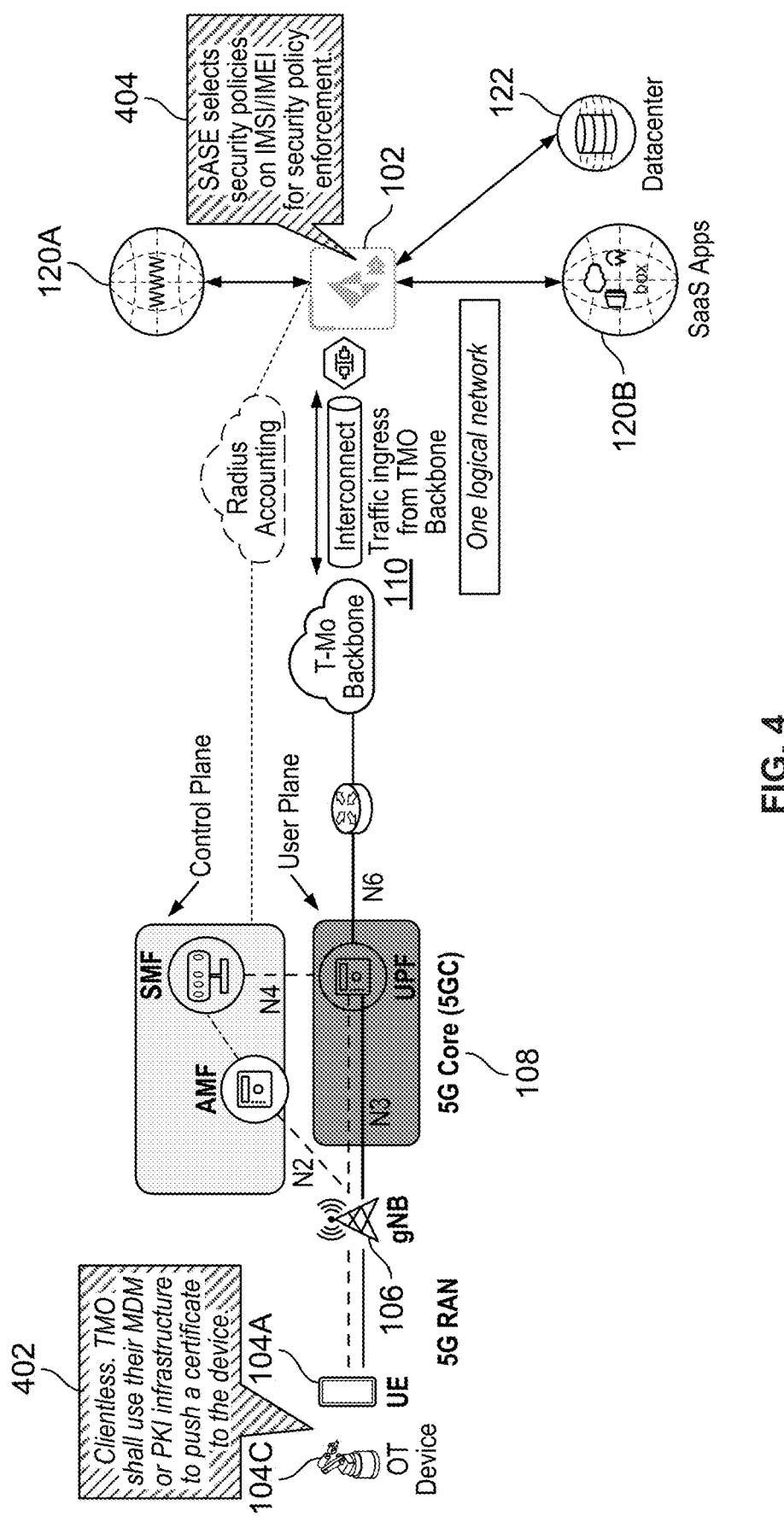
FIG. 4 is a block diagram of a 5G network integrated SASE solution for providing enhanced security for mobile networks in accordance with some embodiments.

FIG. 4 is a block diagram of a 5G network integrated SASE solution for providing enhanced security for mobile networks in accordance with some embodiments. The disclosed techniques for providing a SASE solution for mobile networks are similarly shown in FIG. 4 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

FIG. 4 illustrates an example architecture that is generally similar to that shown and described above with respect to FIG. 2. Specifically, in this 5G network integrated SASE solution for mobile networks, an example implementation for providing a clientless/agentless solution for providing a SASE solution for mobile networks is provided as will now be described below.

Referring to FIG. 4 as shown at 402, not all devices attaching to the 5G core mobile network include a SIM card, such as certain OT devices 104C. Specifically, for 5G devices with no agent, there needs to be a mechanism to support SSL decryption for comprehensive zero trust security enforcement. In a traditional SASE use case (e.g., Prisma Access (PA) use case), digital certificates are typically deployed and managed via an agent (e.g., a Global-Protect (GP) agent for endpoints connecting to the PA cloud).

However, in this example use case, such as shown in FIG. 4, there is no agent that has already been deployed to these endpoints (e.g., OT devices 104C).

In an example implementation, the mobile operator (TMO) can use a mobile device management (MDM) solution or public key infrastructure (PKI) to push a digital certificate (CERT) to the device (e.g., OT device or other devices). Specifically, the TMO can use their PKI to generate an intermediate root and import it to the SASE provider (e.g., PA or another SASE solution), so that the SASE provider can use the certificate for decryption (e.g., SSL decryption, etc.) of traffic from that device. More specifically, the digital certificate facilitates the SASE provider to decrypt encrypted traffic sent from the UE over the mobile network to its destination (e.g., to decrypt SSL traffic and/or other encrypted protocol traffic, such as to a SaaS application, web site, or an enterprise data center resource/application, etc.) as the disclosed SASE for mobile network techniques do not allow for a man-in-the-middle approach for decrypting such traffic.

In another example implementation, such digital certificates are pushed to such OT/other devices using an out-of-band communication channel. For example, the digital certificate can be pushed/deployed to the OT/other device as an initial handshake when the device attempts to connect to the 5G mobile network (e.g., and/or other mechanisms can include an app can be provided via an app store, such as for Android OS devices or for iOS devices, such that the app can be downloaded to these devices for deploying such digital certificates, and/or various other push/pull mechanisms can similarly be used for deploying these digital certificates to such devices). As another example, MDM or PKI infrastructure can be deployed with Certificate chaining to push digital certificates (certs) to the devices.

As shown at 404, the above-described techniques facilitate providing a SASE solution for mobile networks in which the SASE solution enforces security policies on IMSI/IMEI (e.g., and/or other contextual information) as similarly described above, including for network traffic that is decrypted using the above described techniques using a deployed digital certificate for certain devices.

Figure 5:
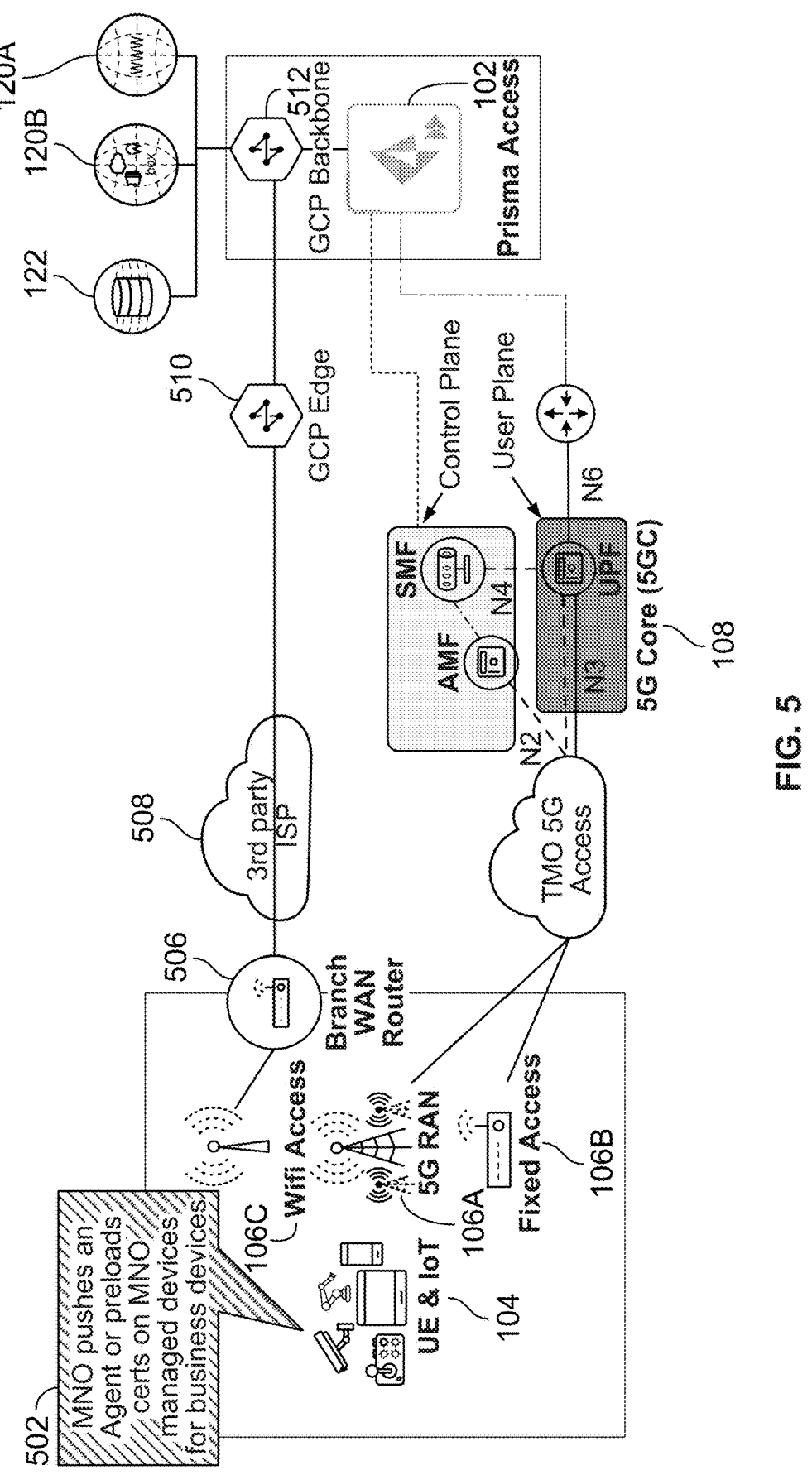
FIG. 5 is a block diagram of a comprehensive SASE solution across networks in accordance with some embodiments.

FIG. 5 is a block diagram of a comprehensive SASE solution across networks in accordance with some embodiments. The disclosed techniques for providing a SASE solution for mobile networks are similarly shown in FIG. 5 with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

FIG. 5 illustrates an example architecture that is generally similar to that shown and described above with respect to FIG. 2. Specifically, in this 5G network integrated SASE solution for mobile networks, an example implementation for providing a clientless/agentless solution for providing a SASE solution for mobile networks and across other access networks is provided as will now be described below.

As shown in FIG. 5, in this example deployment, the SASE solution 102 is provided for devices 104 (e.g., UE and IoT, and/or other types of devices) that connect via a 5G mobile network via 106A and 108 as well as other networks, such as via fixed access 106B to the mobile network 108, and/or via Wi-Fi access 106C, such as through a branch wide area network (WAN) router 506 to a $3^{rd}$ party Internet Service Provider (ISP) to a GCP edge network 510 and a GCP backbone 512 to the SASE cloud 102.

In this example deployment, zero trust policy enforcement can be performed using SASE 102 for devices connecting through the 5G mobile network as well as for devices connecting through the $3^{rd}$ party ISP 508 network. Specifically, as shown at 502, the MNO pushes an Agent (e.g., a GP Agent for a Prisma Access SASE solution, or another commercially available agent can similarly be used for another commercially available SASE solution) on MNO managed devices for business devices (e.g., or such agents can similarly be preloaded on such MNO managed devices for business devices).

Figure 6A:
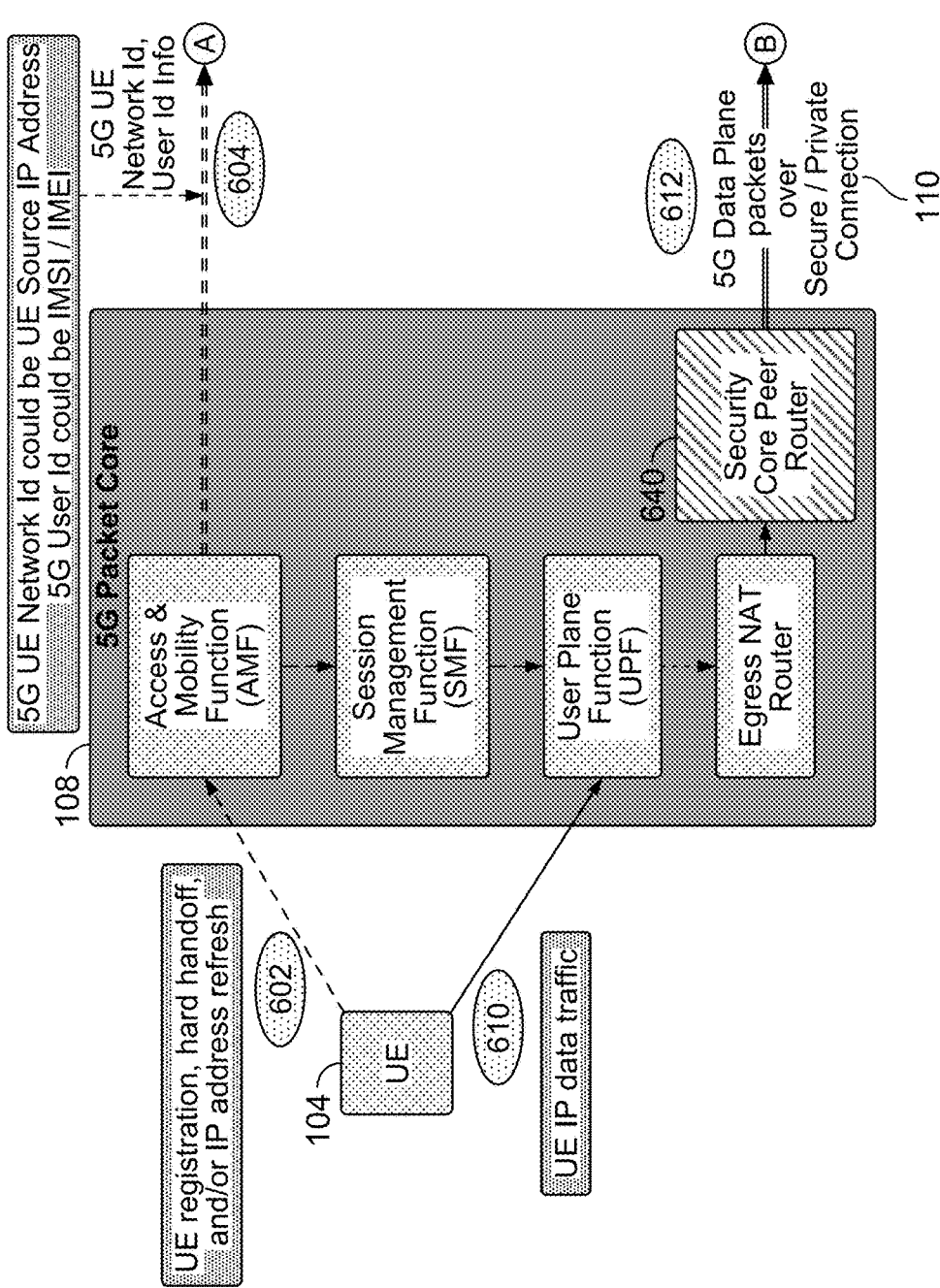
FIG. 6A is a block diagram of a data flow for providing a SASE solution for mobile networks in accordance with some embodiments.
Figure 6A:
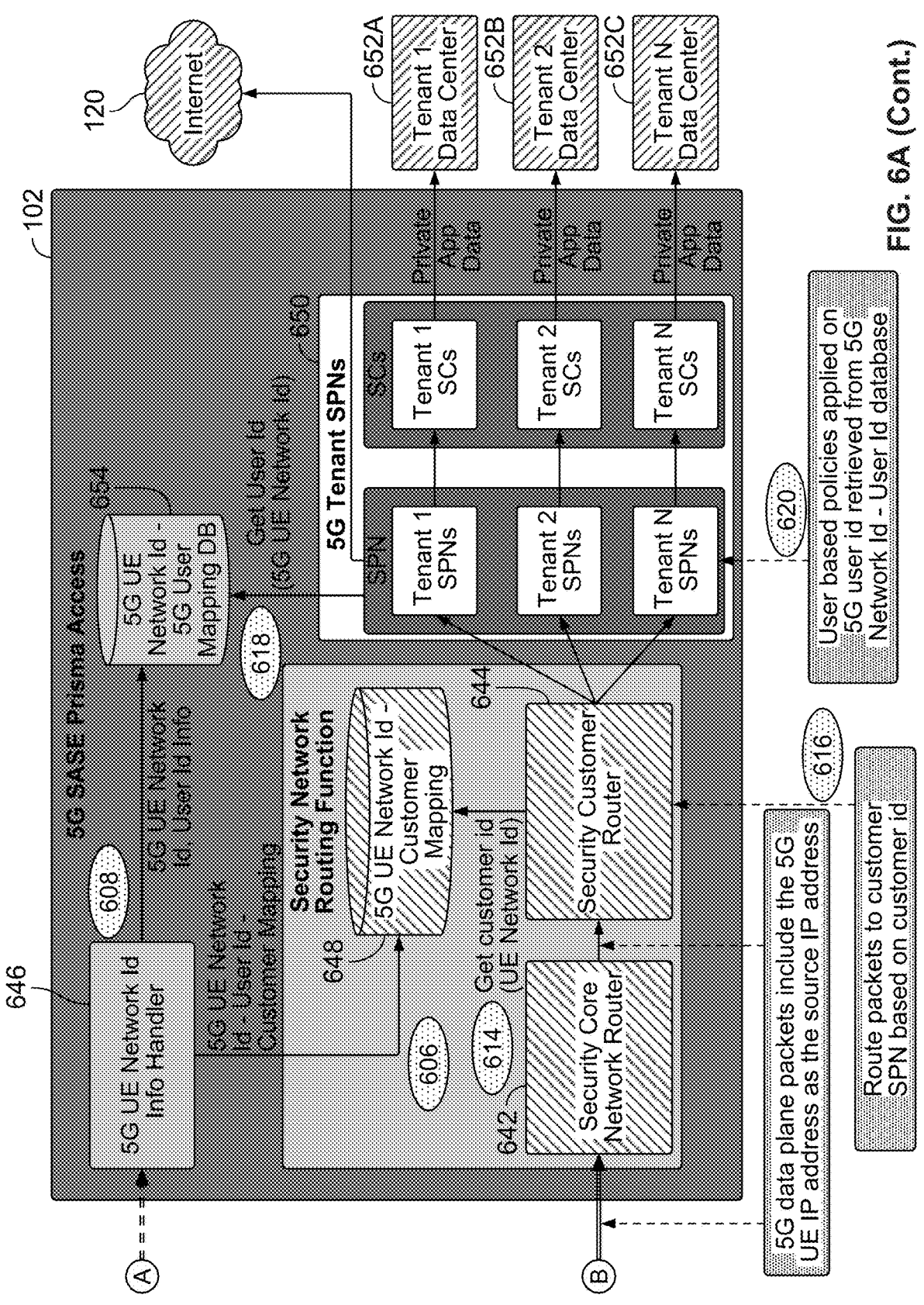

FIG. 6A is a block diagram of a data flow for providing a SASE solution for mobile networks in accordance with some embodiments. The disclosed techniques for providing a SASE solution for mobile networks are similarly shown in FIG. 6A with respect to a 5G mobile network environment. However, as also discussed above, it would be apparent to one of ordinary skill in the art that the disclosed techniques can similarly be applied to various other example mobile service provider environments, such as 4G/5G/6G or later mobile network environments.

FIG. 6A illustrates an example architecture that is generally similar to that shown and described above with respect to FIG. 2. In this example implementation, an example data flow through the 5G packet core 108 and the SASE cloud environment 102 are shown and further described below.

Referring to FIG. 6A, at 602, a UE registration, hard handoff and/or IP address refresh is performed.

At 604, 5G UE Network ID, User ID information is provided from the 5G packet core network 108 to a 5G UE Network ID Information Handler entity 646 in the 5G SASE cloud 102 (e.g., 5G SASE Prisma Access (PA) cloud). In this example implementation, the 5G UE Network ID can be the UE source IP address, and the 5G User ID can be the IMSI/IMEI.

At 606, the 5G UE Network ID and User ID to customer mapping is provided to a 5G UE network ID to Customer Mapping data store 648 (e.g., a SQL or other type of data store).

At 608, the 5G UE Network ID, User ID information is also provided to a 5G UE Network ID to 5G User Mapping data store (e.g., a SQL or other type of data store).

At 610, the UE IP data (e.g., user plane) traffic passes through the 5G packet core network 108.

At 612, the 5G data plane packets are sent over a secure/private connection, such as a cloud to cloud interconnect (e.g., a GCP interconnect or other commercially available cloud platform interconnect), such as similarly described above with respect to FIGS. 1 and 2, from the 5G packet core network 108 to a security core network router 642 in the 5G SASE cloud 102. In this example implementation, the 5G data plane packets include the 5G UE IP address as the source IP address.

At 614, a lookup from a security customer router 644 is performed to get a Customer ID (e.g., UE Network ID) from the 5G UE Network ID to Customer Mapping data store 648.

At 616, the data plane packets are routed to the appropriate Tenant SPN of the 5G Tenant SPNs 650 based on the associated Customer ID.

At 618, a lookup from the Tenant SPN is performed to get a User ID (e.g., 5G UE Network ID) from the 5G UE Network ID to 5G User Mapping data store 654.

At 620, user based policies are applied/enforced on the 5G User ID retrieved from the 5G Network ID to User ID data store at the corresponding 5G Tenant SPNs.

The secured/filtered/clean traffic is then forwarded to its original destination, such as to the Internet 120 and/or to the relevant Tenant's Data Center, such as shown at 652A, 652B, or 652C.

Figure 6B:
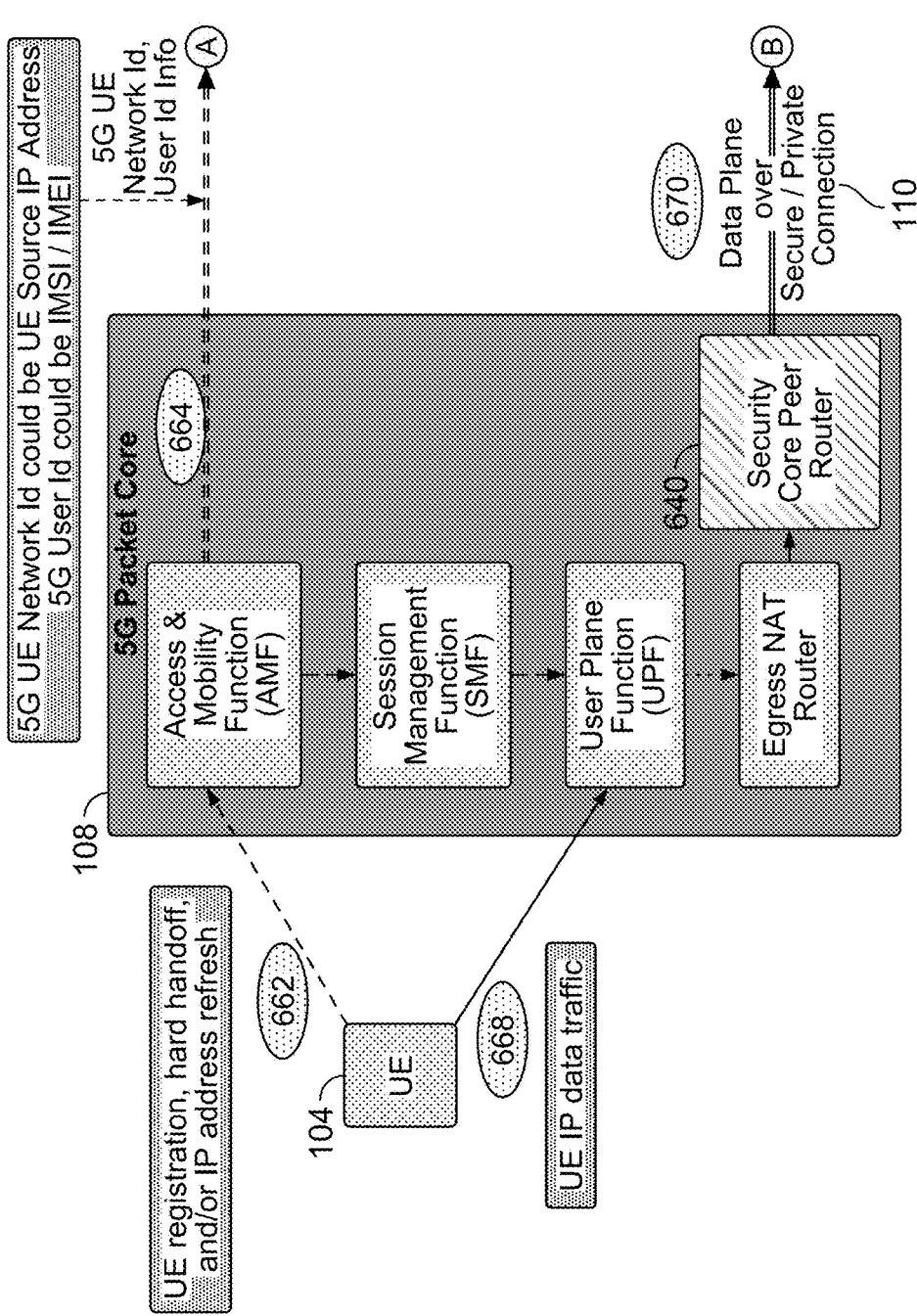
FIG. 6B is a block diagram of a data flow with encapsulation of meta information for providing a SASE solution for mobile networks in accordance with some embodiments.
Figure 6B:
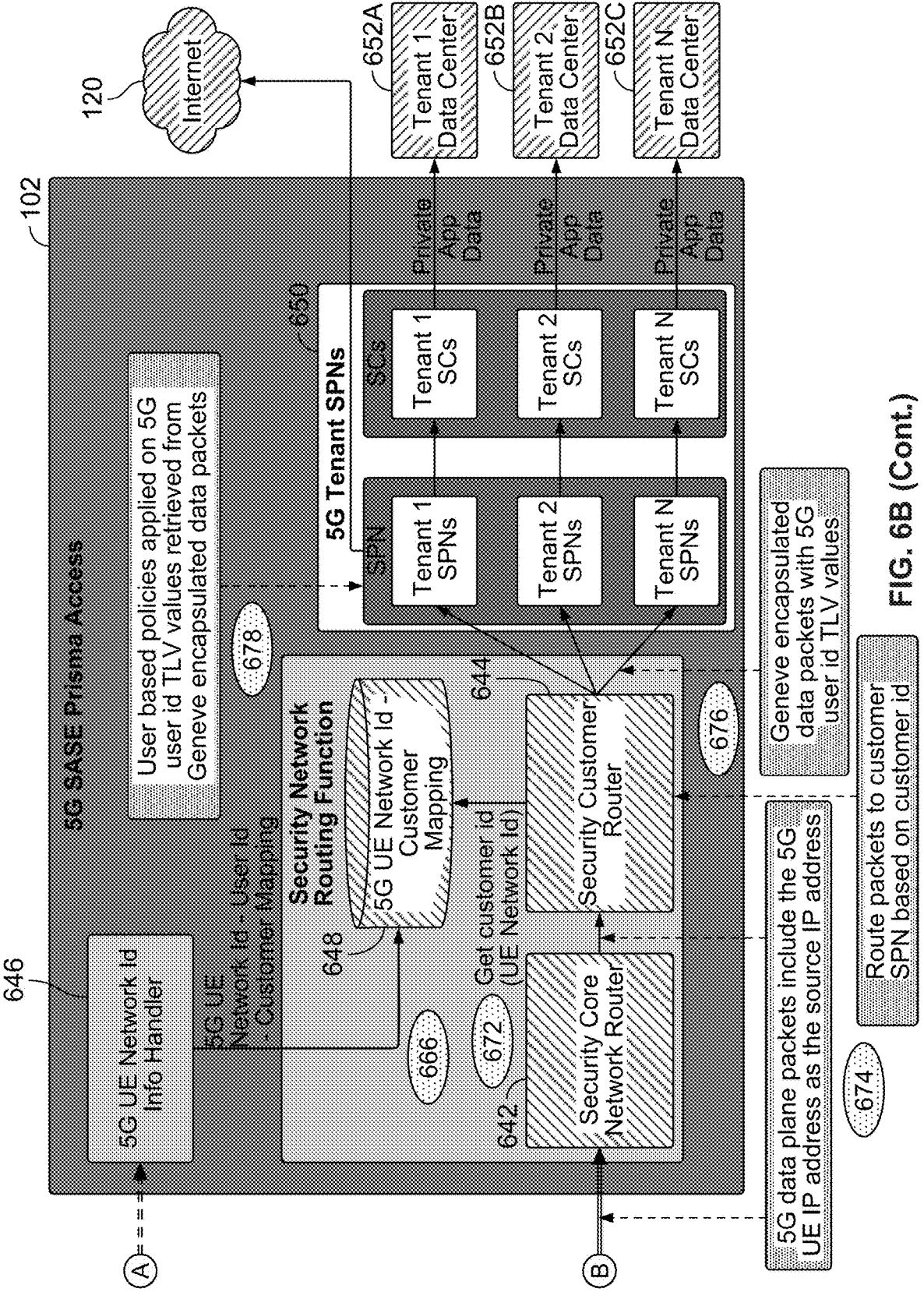

FIG. 6B is a block diagram of a data flow with encapsulation of meta information for providing a SASE solution for mobile networks in accordance with some embodiments. In this example implementation, an example data flow through the 5G packet core 108 and the SASE cloud environment 102 are shown and further described below.

Referring to FIG. 6B at 662, a UE registration, hard handoff and/or IP address refresh is performed.

At 664, 5G UE Network ID, User ID information is provided from the 5G packet core network 108 to a 5G UE Network ID Information Handler entity 646 in the 5G SASE cloud 102 (e.g., 5G SASE Prisma Access (PA) cloud). In this example implementation, the 5G UE Network ID can be the UE source IP address, and the 5G User ID can be the IMSI/IMEI.

At 666, the 5G UE Network ID and User ID to customer mapping is provided to a 5G UE network ID to Customer Mapping data store 648 (e.g., a SQL or other type of data store).

At 668, the UE IP data (e.g., user plane) traffic passes through the 5G packet core network 108.

At 670, the 5G data plane packets are sent over a secure/private connection, such as a cloud to cloud interconnect (e.g., a GCP interconnect or other commercially available cloud platform interconnect), such as similarly described above with respect to FIGS. 1 and 2, from the 5G packet core network 108 to a security core network router 642 in the 5G SASE cloud 102. In this example implementation, the 5G data plane packets include the 5G UE IP address as the source IP address.

At 672, a lookup from a security customer router 644 is performed to get a Customer ID (e.g., UE Network ID) from the 5G UE Network ID to Customer Mapping data store 648.

At 674, the data plane packets are routed to the appropriate Tenant SPN of the 5G Tenant SPNs 650 based on the associated Customer ID.

At 676, encapsulated data packets with the 5G User ID TLV Type Length Value (TLV) field values (e.g., fields with type, field length, and field values) are sent from the security customer router 644 to the Tenant SPN of the 5G Tenant SPNs 650 based on the associated Customer ID. In an example implementation, the UE user/data plane traffic can be encapsulated (e.g., using a Geneve tunnel or another encapsulation technique) with meta information (e.g., including IMSI, IMEI, APN/DNN, location, network slice, RAT, and/or other contextual information). As described above, user/data plane traffic can be correlated with such contextual information based on the UE IP associated with the traffic and the stored contextual information received from the control plane traffic for that UE associated with that UE IP address during an initial connection with the 5G mobile network.

At 678, user based policies are applied/enforced on the 5G User ID TLV values retrieved from the encapsulated (e.g., Geneve encapsulated) data packets.

The secured/filtered/clean traffic is then forwarded to its original destination, such as to the Internet 120 and/or to the relevant Tenant's Data Center, such as shown at 652A, 652B, or 652C.

Accordingly, the above-described techniques and various embodiments for providing SASE for mobile networks can be applied to provide one or more of the following: (1) secure data traffic flow (e.g., private app access, SaaS app access, other apps/services, etc.) from and to 4G/5G/6G/later devices; (2) secure Internet access from 4G/5G/6G/later UEs; (3) secure access to enterprise data center from 4G/5G/6G/later UEs; (4) enforcement of UE (user) specific security policies (e.g., based on UE IP, IMSI, IMEI, location, APN/DNN, network slice, RAT, and/or other contextual information); and (5) separation of security policies for each tenant (e.g., automatically detecting each MSP Enterprise tenant (tenant ID) associated with each data packet passing through the SASE/security core network).

Additional example processes for the disclosed techniques for providing SASE for mobile networks will now be described.

Example Processes for SASE for Mobile Networks

FIG. 7 is a flow diagram of a process for providing SASE for mobile networks in accordance with some embodiments. In some embodiments, a process 700 as shown in FIG. 7 is performed by the SASE solution and techniques as similarly described above including the embodiments described above with respect to FIGS. 1-6. In one embodiment, process 700 is performed, at least in part, by 5G SPN clusters 114 as described above with respect to FIGS. 1 and 2 and/or 5G Tenant SPNs 650 as described above with respect to FIGS. 6A and 6B.

The process begins at 702. At 702, traffic associated with a User Equipment (UE) from a mobile core network is received at a Secure Access Service Edge (SASE) cloud network. As similarly described above with respect to FIGS. 1 and 2 as well as FIGS. 6A and 6B, an interconnect (e.g., a GCP interconnect or other cloud to cloud interconnect) can be used for securely transmitting traffic from the mobile core network to the SASE cloud network.

At 704, enforcing a security policy on data plane traffic associated with the UE based on contextual information associated with the UE to provide secured data plane traffic is performed. For example, various enforcement actions (e.g., allow/pass, block/drop, alert, tag, monitor, log, throttle, restrict access, and/or other enforcement actions) can be performed using the security platform as similarly described above. As similarly described above with respect to FIGS. 1-6, the security policy can be determined and/or enforced based on various combinations of UE IP, location, hardware identifier, subscriber identity, and RAT information and/or based on information detected/determined using DPI-based firewall techniques, such as by performing URL filtering, identifying an Application-ID, identifying a Content-ID, and/or using other DPI-based firewall techniques as similarly described above.

At 706, forwarding the secured data plane traffic from the SASE cloud network to the mobile core network is performed. In this example implementation, the secured data plane traffic egresses the mobile core network to its original destination.

FIG. 8 is another flow diagram of a process for providing SASE for mobile networks in accordance with some embodiments. In some embodiments, a process 700 as shown in FIG. 8 is performed by the SASE solution and techniques as similarly described above including the embodiments described above with respect to FIGS. 1-6. In one embodiment, process 800 is performed, at least in part, by 5G SPN clusters 114 as described above with respect to FIGS. 1 and 2 and/or 5G Tenant SPNs 650 as described above with respect to FIGS. 6A and 6B.

The process begins at 802. At 802, traffic associated with a User Equipment (UE) from a mobile core network is received at a Secure Access Service Edge (SASE) cloud network. As similarly described above with respect to FIGS. 1 and 2 as well as FIGS. 6A and 6B, an interconnect (e.g., a GCP interconnect or other cloud to cloud interconnect) can be used for securely transmitting traffic from the mobile core network to the SASE cloud network.

At 804, enforcing a security policy on data plane traffic associated with the UE based on contextual information associated with the UE to provide secured data plane traffic is performed. For example, various enforcement actions (e.g., allow/pass, block/drop, alert, tag, monitor, log, throttle, restrict access, and/or other enforcement actions) can be performed using the security platform as similarly described above. As similarly described above with respect to FIGS. 1-6, the security policy can be determined and/or enforced based on various combinations of UE IP, location, hardware identifier, subscriber identity, and RAT information and/or based on information detected/determined using DPI-based firewall techniques, such as by performing URL filtering, identifying an Application-ID, identifying a Content-ID, and/or using other DPI-based firewall techniques as similarly described above.

At 806, forwarding the secured data plane traffic from the SASE cloud network to its original destination is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive traffic associated with a User Equipment (UE) from a mobile core network at a Secure Access Service Edge (SASE) cloud network;

enforce a security policy on data plane traffic associated with the UE based on contextual information associated with the UE to provide secured data plane traffic; and forward the secured data plane traffic from the SASE cloud network to its original destination; and a memory coupled to the processor and configured to provide the processor with instructions.

2. The system recited in claim 1, wherein the SASE cloud network includes a firewall as a service that is configured with a plurality of security policies based on a subscriber identity and an application identifier, and wherein the subscriber identity includes an International Mobile Subscriber Identity (IMSI).

3. The system recited in claim 1, wherein the SASE cloud network includes a firewall as a service that is configured with a plurality of security policies based on a subscriber identity, a unique device identifier, and an application identifier, wherein the subscriber identity includes an International Mobile Subscriber Identity (IMSI), and wherein the unique device identifier includes an International Mobile Equipment Identifier (IMEI).

4. The system recited in claim 1, wherein the mobile core network includes a 4G mobile core network, a 5G mobile core network, and/or 6G mobile core network.

5. The system recited in claim 1, wherein the data plane traffic is secured from and to 4G, 5G, and/or 6G UE devices.

6. The system recited in claim 1, wherein Internet access is secured from and to 4G, 5G, and/or 6G UE devices.

7. The system recited in claim 1, wherein enterprise data center access is secured from and to 4G, 5G, and/or 6G UE devices.

8. The system recited in claim 1, wherein selection and the enforcement of the security policy is based on the contextual information associated with the UE and the data plane traffic correlated with the UE based on a UE Internet Protocol (IP) address.

9. The system recited in claim 1, wherein a firewall as a service (FWaaS) associated with the SASE is configured to perform Uniform Resource Link (URL) filtering for the data plane traffic.

10. The system recited in claim 1, wherein a firewall as a service (FWaaS) associated with the SASE is configured to perform application Denial of Service (DoS) detection for the data plane traffic.

11. The system recited in claim 1, wherein a firewall as a service (FWaaS) associated with the SASE is configured to perform application Denial of Service (DoS) prevention for the data plane traffic.

12. The system recited in claim 1, wherein each of a plurality of security policies is distinctly selected and enforced for each mobile service provider (MSP) enterprise tenant at the SASE cloud network, wherein per tenant security policy configuration and enforcement are provided by the SASE cloud network.

13. The system recited in claim 1, wherein the data plane traffic is encapsulated with meta information, including a subscriber identity and/or a unique device identifier.

14. The system recited in claim 1, wherein the processor is further configured to:

determine the security policy to apply at the SASE cloud network to the data plane traffic based on a subscriber identity and/or a unique device identifier.

15. The system recited in claim 1, wherein the processor is further configured to:

receive a control message over a network protocol from the mobile core network at the SASE cloud network, wherein contextual information associated with the control message is communicated using a DIAMETER protocol, a Radius protocol, and/or via an Application Programming Interface (API).

16. The system recited in claim 1, wherein the processor is further configured to:

receive an accounting message from the mobile core network at the SASE cloud network, wherein contextual information associated with the accounting message is communicated using a DIAMETER protocol, a Radius protocol, and/or via an Application Programming Interface (API).

17. A method, comprising:

receiving traffic associated with a User Equipment (UE) from a mobile core network at a Secure Access Service Edge (SASE) cloud network;

enforcing a security policy on data plane traffic associated with the UE based on contextual information associated with the UE to provide secured data plane traffic; and forwarding the secured data plane traffic from the SASE cloud network to its original destination.

18. The method of claim 17, wherein the SASE cloud network includes a firewall as a service that is configured with a plurality of security policies based on a subscriber identity and an application identifier, and wherein the subscriber identity includes an International Mobile Subscriber Identity (IMSI).

19. The method of claim 17, wherein the SASE cloud network includes a firewall as a service that is configured with a plurality of security policies based on a subscriber identity, a unique device identifier, and an application identifier, wherein the subscriber identity includes an International Mobile Subscriber Identity (IMSI), and wherein the unique device identifier includes an International Mobile Equipment Identifier (IMEI).

20. A computer program product, the computer program product being embodied in a tangible computer readable storage medium and comprising computer instructions for:

receiving traffic associated with a User Equipment (UE) from a mobile core network at a Secure Access Service Edge (SASE) cloud network;

enforcing a security policy on data plane traffic associated with the UE based on contextual information associated with the UE to provide secured data plane traffic; and forwarding the secured data plane traffic from the SASE cloud network to its original destination.

* * * * *